United States Patent [19]

Uchimaru et al.

[11] Patent Number: 5,740,150
[45] Date of Patent: Apr. 14, 1998

[54] GALVANOMIRROR AND OPTICAL DISK DRIVE USING THE SAME

[75] Inventors: Kiyotaka Uchimaru, Tokyo; Akihiro Kasahara, Chiba-ken; Masayuki Sekimura, Tokyo, all of Japan

[73] Assignee: Kabushiki Kaisha Toshiba, Kawasaki, Japan

[21] Appl. No.: 753,323

[22] Filed: Nov. 22, 1996

[30] Foreign Application Priority Data

| | | | |
|---|---|---|---|
| Nov. 24, 1995 | [JP] | Japan | 7-305777 |
| Nov. 24, 1995 | [JP] | Japan | 7-305782 |
| Nov. 24, 1995 | [JP] | Japan | 7-305783 |

[51] Int. Cl.⁶ ............................................ G11B 7/00
[52] U.S. Cl. ............................................ 369/119
[58] Field of Search .......................... 369/112, 119, 369/44.14, 44.15, 44.16, 44.17, 44.19, 44.21, 44.22

[56] References Cited

U.S. PATENT DOCUMENTS 4,782,474  11/1988  Arai et al. .................. 369/119 X

FOREIGN PATENT DOCUMENTS

| | | |
|---|---|---|
| 2-023849 | 5/1990 | Japan . |
| 3-131767 | 6/1991 | Japan . |
| 3-053702 | 8/1991 | Japan . |
| 5-119280 | 5/1993 | Japan . |

*Primary Examiner*—Paul W. Huber
*Attorney, Agent, or Firm*—Cushman, Darby & Cushman IP Group of Pillsbury, Madison & Sutro LLP

[57] ABSTRACT

An optical disk drive has a drive unit for driving a disk and an optical head for focusing a laser beam onto the disk. The optical head has a light source for emitting the laser beam, a galvanomirror for correcting a light passage of the emitted laser beam, and a lens for focusing the laser beam from the galvanomirror onto the disk. The galvanomirror has a rocking portion being electrically chargeable, and one surface of the rocking portion having a reflection surface for reflecting the laser beam. The rocking portion is rockably supported by first end portions of supporting portions. Second end portions of the supporting portions are connected to a second plate (fixing portion). The second plate has an opposed portion opposed to the other surface of the rocking portion with a predetermined gap interposed. Electrically chargeable electrodes are provided on the opposed portion of the second plate, for electrostatically driving the rocking portion thereby reflecting the laser beam at a desired angle. The other surface of the rocking portion is provided with recess portions for reducing an air pressure caused when the rocking portion is rocked.

34 Claims, 18 Drawing Sheets

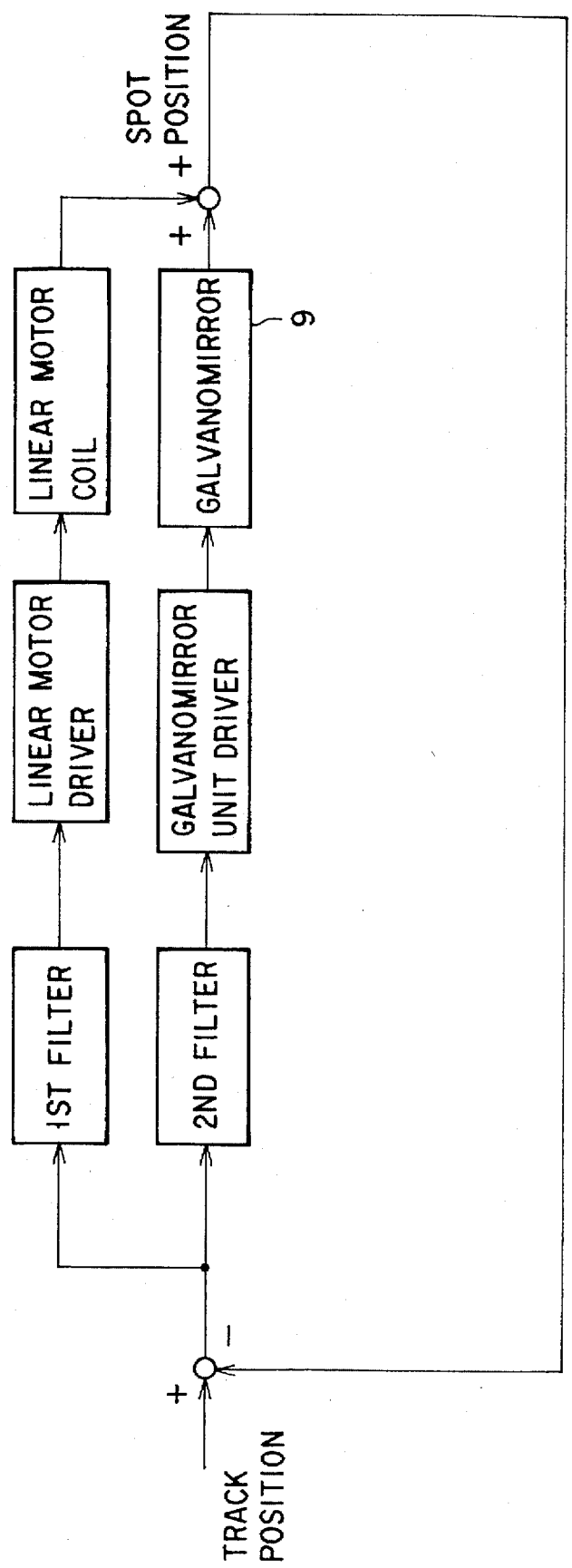
F I G. 5

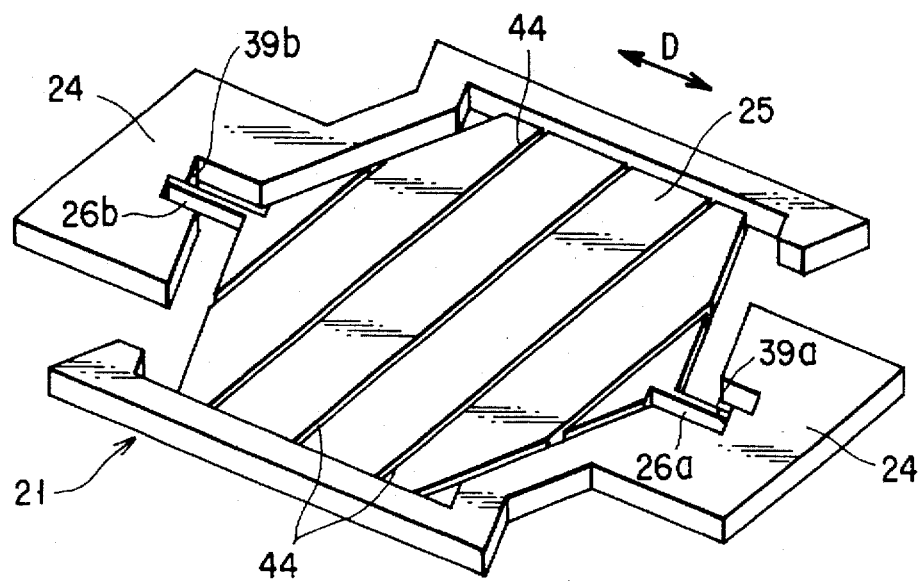
F I G. 11
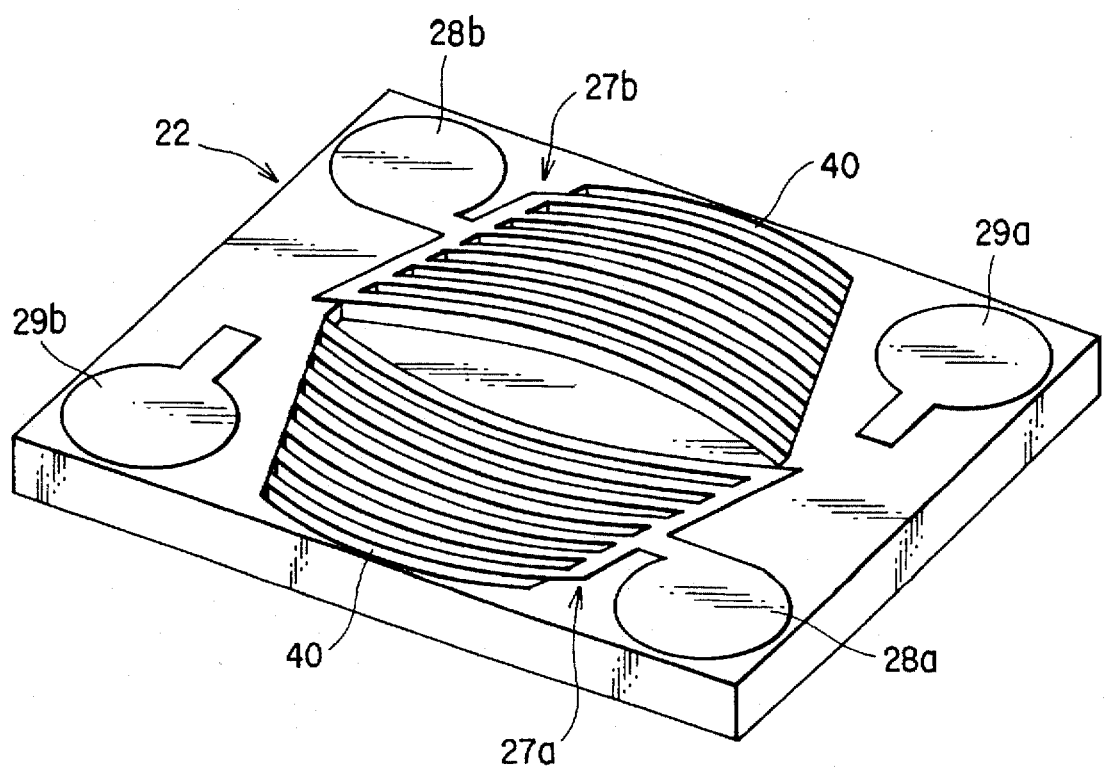
F I G. 12

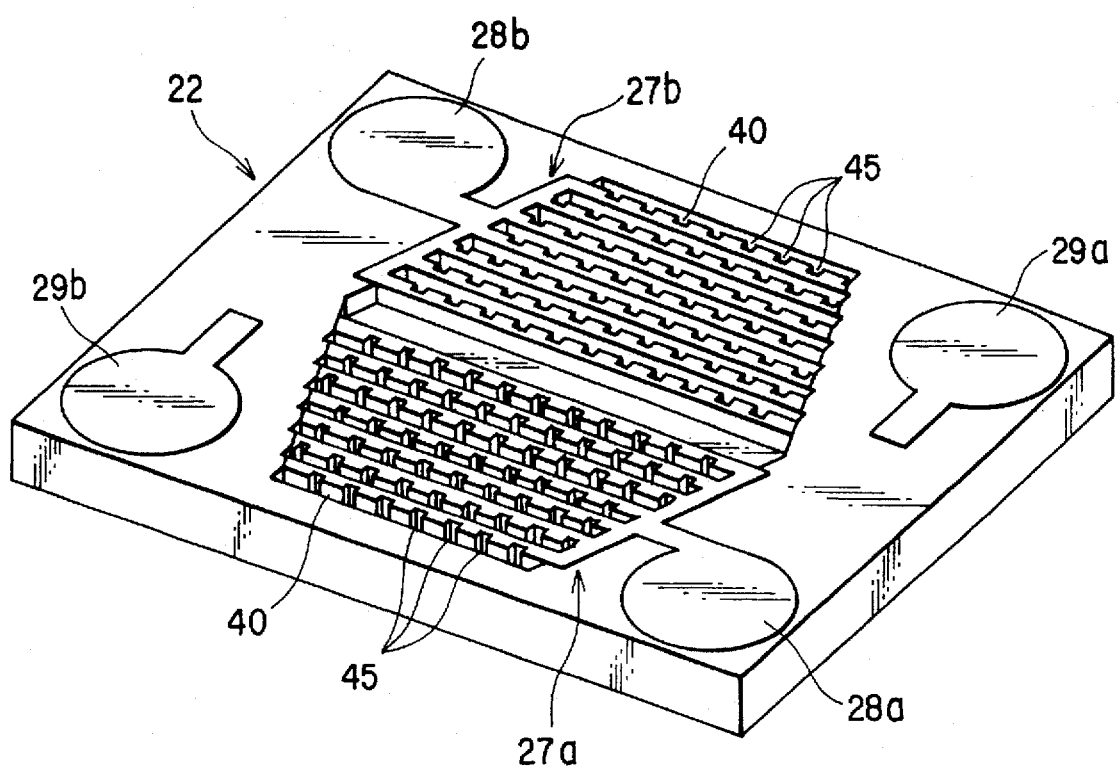
F I G. 13
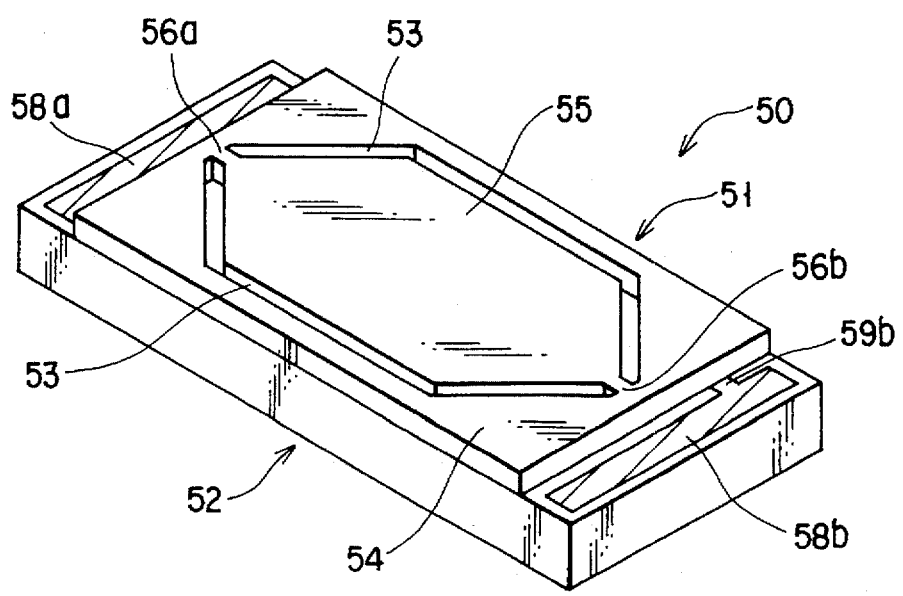
F I G. 14

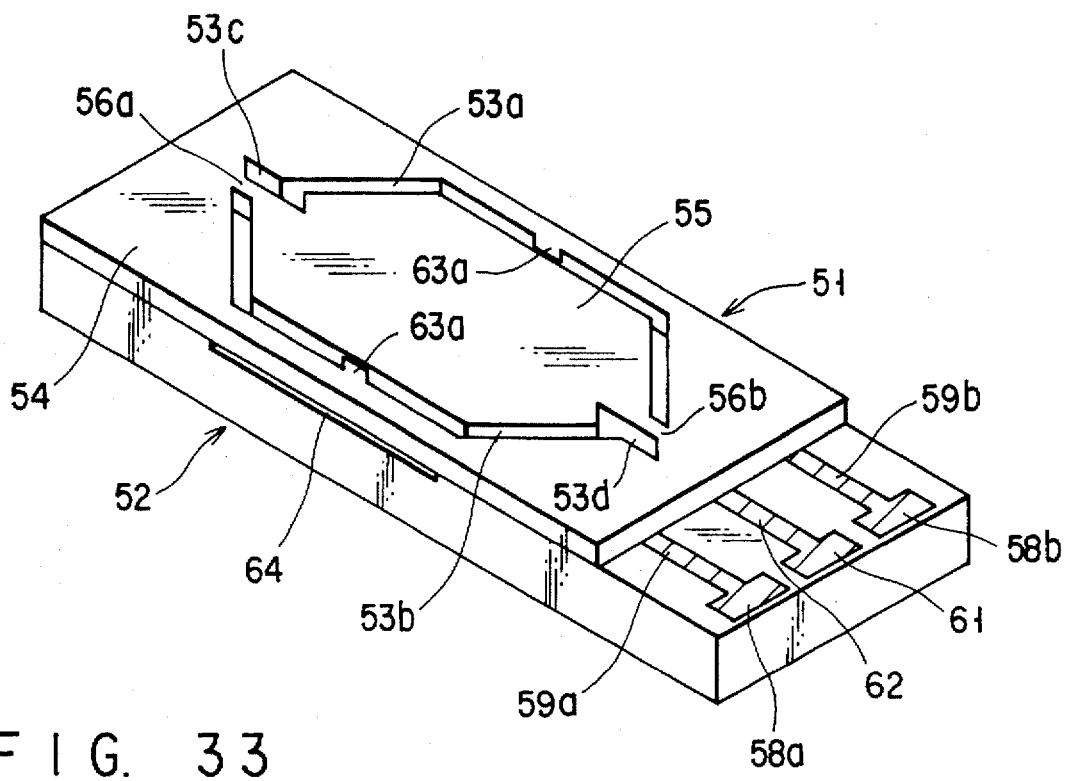
F I G. 33
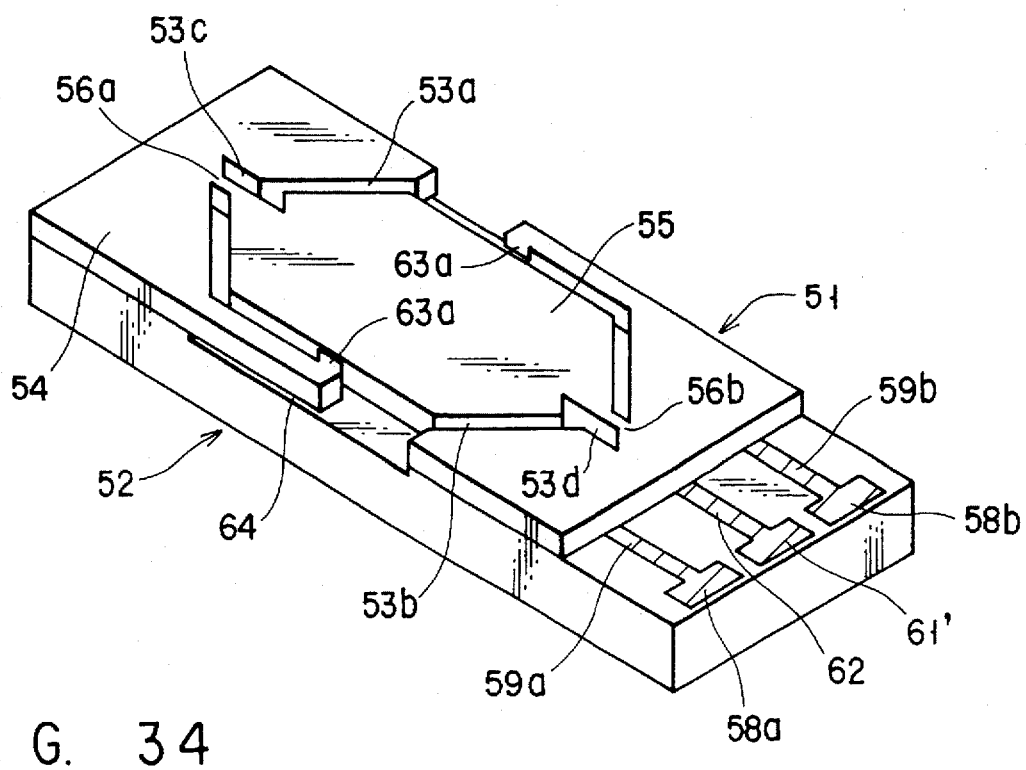
F I G. 34

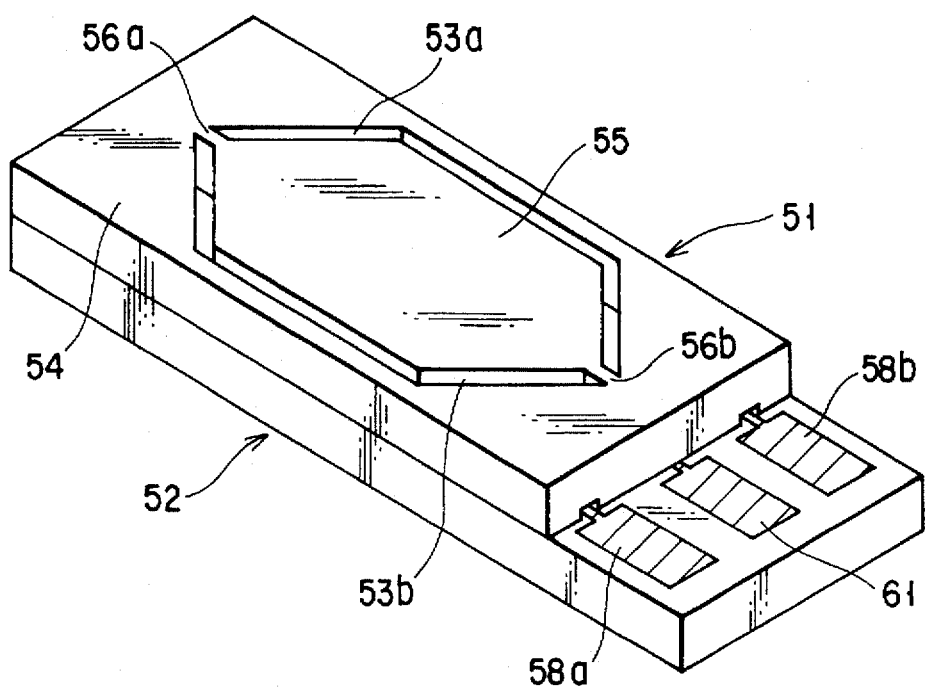
F I G. 35
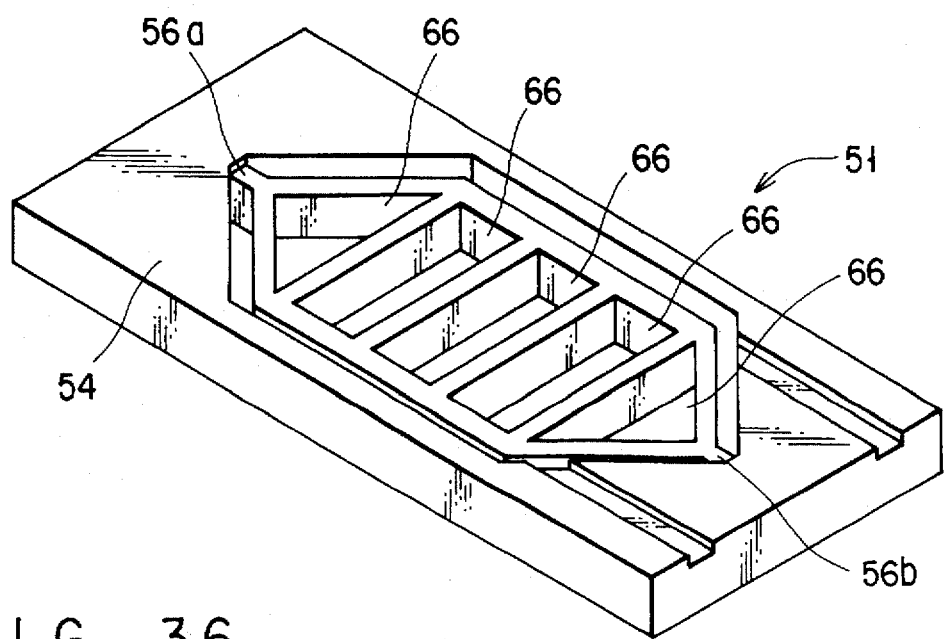
F I G. 36

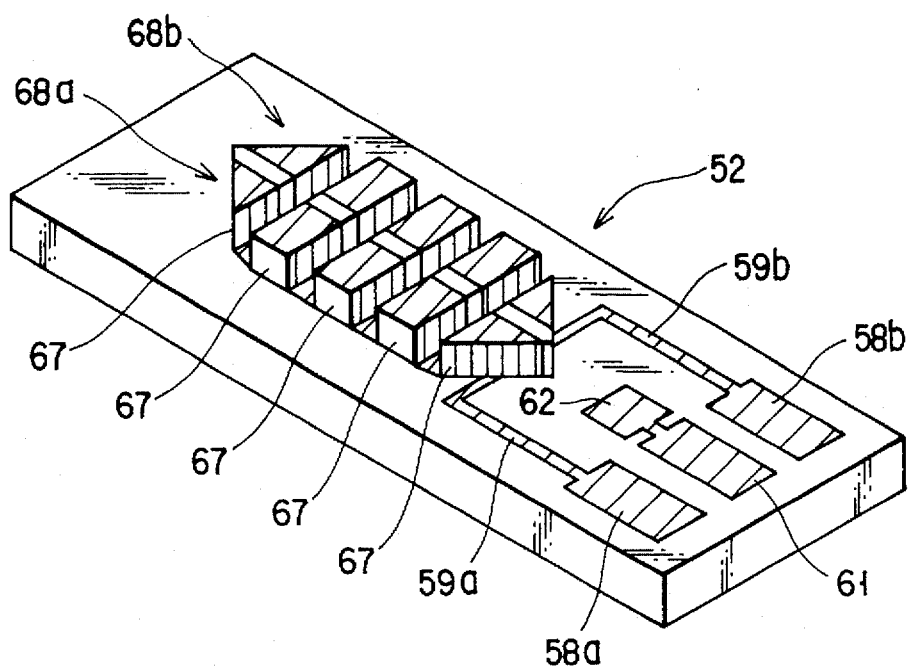
F I G. 37
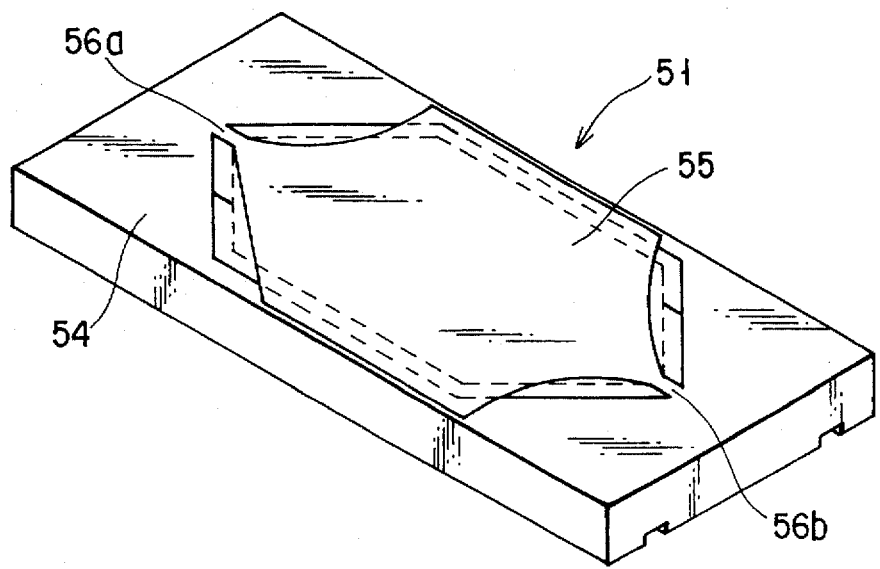
F I G. 38

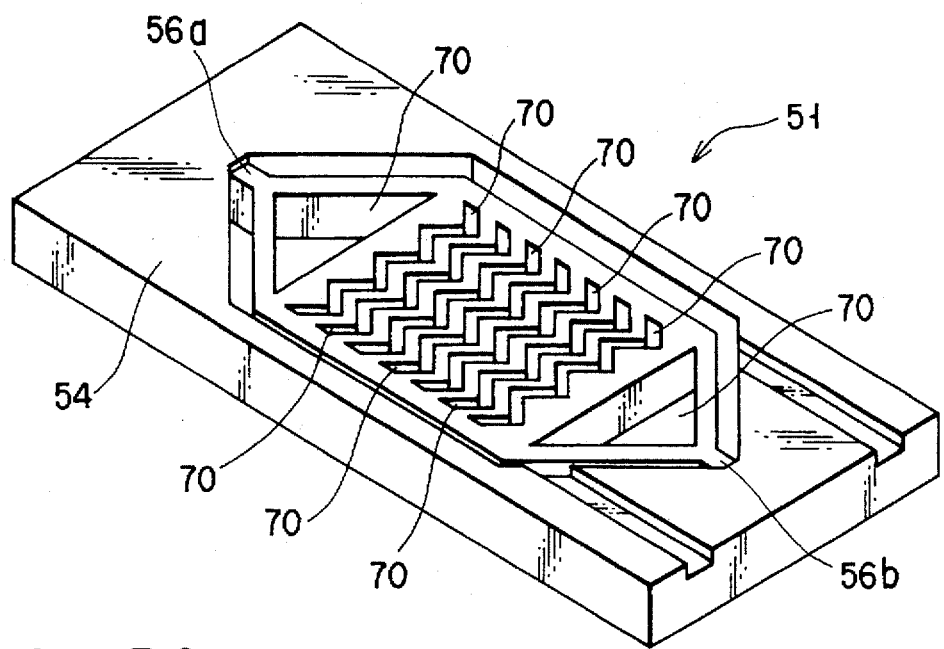
F I G. 39
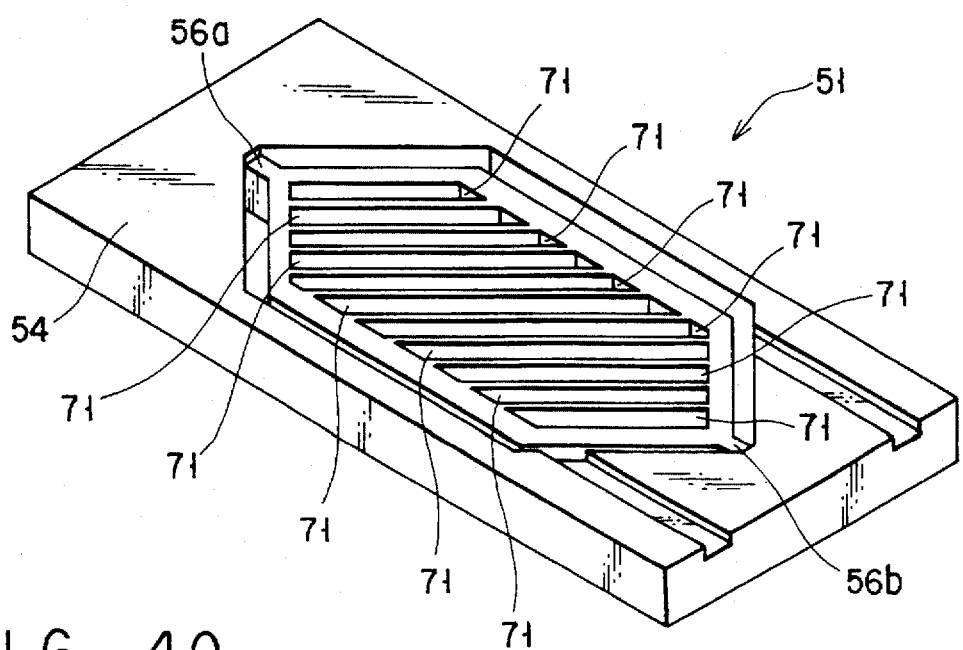
F I G. 40

GALVANOMIRROR AND OPTICAL DISK DRIVE USING THE SAME

BACKGROUND OF THE INVENTION

1. Field of the Invention

The present invention relates generally to an optical disk drive for recording/reproducing information on/from an optical disk by means of an optical head having a galvanomirror for reflecting a laser beam in a desired direction, and more particularly to an optical disk drive wherein the galvanomirror is driven by an electrostatic power, thereby reducing the weight of the optical head.

2. Description of the Related Art

As is well known, an optical disk drive for reproducing information by using a laser beam, such as a compact disk (CD) or a laser disk (LD), has been widely used. Recently, an optical disk drive has been utilized as a memory device of a computer and accordingly there has been an increasing demand for a high-speed operation of an optical head with an optical system so as to enable data to be recorded/reproduced at high speed.

To meet the demand, there is proposed a system for achieving a quick seek by making the optical head as light as possible. One example of the system is a separated optical system wherein an optical head is not loaded with a semiconductor laser (light source), a photodetector, or the like, but only with an objective lens for focusing a laser beam on an optical disk.

This separated optical system adopts means for (varying the angle of the laser beam incident upon the objective lens and positioning the laser beam on a desired track of the disk) by controlling a rocking angle of a galvanomirror disposed on a fixed system, when the optical head is driven in the tracking direction and the beam is precisely positioned on the track of the disk. According to this structure, there is no need to mount means, e.g. means for moving the objective lens itself in the tracking direction, on the optical head (moving system), and thus the inertial mass of the entire optical head can be reduced and a quick seek can be achieved.

However, there is a danger that the surface of reflection mirror will incline gradually due to variations in temperature and with age. Since this inclination makes it difficult to accurately guide a laser beam reflected by the galvanomirror to the objective lens, a tracking offset may occur and thus a correct tracking operation may not be performed. Moreover, since the influence of the inclination varies with a distance from the galvanomirror to the objective lens, there is a need for a complicated control of, e.g. further correcting the rocking angle of the galvanomirror in accordance with the current position of the optical head.

In order to obviate these shortcomings, it is necessary to maintain a fixed distance between the galvanomirror and the objective lens by mounting the galvanomirror on the optical head, that is, to adopt a fixed optical system wherein the optical head and optical system are integrated.

However, the conventional galvanomirror is designed to be rocked by a magnetic force, and it comprises such members as a yoke, a magnet and a coil. If the optical head is loaded with the galvanomirror, the inertial mass of the optical head increases and high-speed seek of the optical head cannot be achieved. This being the case, it is difficult, in fact, to achieve high-speed seek of the optical head loaded with the galvanomirror.

SUMMARY OF THE INVENTION

The object of the invention, therefore, is to provide a light, compact galvanomirror, thereby reducing the weight of an optical head loaded with the galvanomirror and providing an optical disk apparatus capable of driving the optical head at high seek speed.

According to a first aspect of the present invention, there is provided an optical disk drive having a drive unit for driving a storage medium and an optical head, driven relative to the storage medium, for focusing a laser beam onto the storage medium, the optical head including a light source for emitting the laser beam, a galvanomirror for correcting a light passage of the emitted laser beam, a lens for focusing the laser beam from the galvanomirror onto the storage medium, and light receiving means for receiving the laser beam reflected by the storage medium, the galvanomirror comprising:

a rocking portion having one surface and the other surface, the rocking portion being electrically chargeable, and the one surface having a reflection surface for reflecting the laser beam;

a support portion, having one end portion and the other end portion, for rockably supporting the rocking portion, the one end portion being connected to the rocking portion;

a fixing member connected to the other end portion of the support portion and having an opposed portion opposed to the other surface of the rocking portion with a predetermined gap interposed; and an electrically chargeable electrode, provided on the opposed portion of the fixing member, for electrostatically driving the rocking portion, thereby reflecting the laser beam at a desired angle, wherein at least one of the other surface of the rocking portion and the opposed portion of the fixing member being provided with a passage for reducing an air pressure caused when the rocking portion is rocked.

According to the above structure, when the rocking portion is rocked by electrostatic power, an air pressure created between the rocking portion and the fixing portion can be reduced by letting the air flow through the passage. Thus, an increase in viscous resistance due to the air pressure is prevented between the rocking portion and fixing portion. Accordingly, the rocking portion can be rocked smoothly. With a relatively weak drive force, galvanomirror can be driven at high speed. Therefore, the driving unit for the galvanomirror can be reduced in size and weight.

Besides, the optical disk drive having this structure does not comprise elements with great mass, such as a yoke, a magnet and a coil. Thus, the optical head can be reduced in size and weight. The optical disk drive using this light, small optical head can be driven for quick seek.

Even if the optical head is driven by electromagnetic force, the galvanomirror of this invention is driven by electrostatic force. Thus, there is no crosstalk (interaction) between the optical head and galvanomirror. Accordingly, the objective lens and galvanomirror can be situated close to each other, and the size of the optical head can be further reduced. In the optical disk drive using the galvanomirror which is free of crosstalk, the precision of seek and the reliability of recording/reproduction can be enhanced.

Since the galvanomirror of this invention is driven by electrostatic force, the power consumption can be reduced. In the optical disk drive using this galvanomirror, a thermal adverse affect on the optical unit (including elements such as a semiconductor laser) and the objective lens, which are mounted on the optical head, can be sufficiently avoided.

According to a second aspect of the invention, there is provided an optical disk drive having a drive unit for driving a storage medium and an optical head, driven relative to the storage medium, for focusing a laser beam onto the storage medium, the optical head including a light source for emitting the laser beam, a galvanomirror for correcting a light passage of the emitted laser beam, a lens for focusing the laser beam from the galvanomirror onto the storage medium, and light receiving means for receiving the laser beam reflected by the storage medium, the galvanomirror comprising:

a rocking portion having one surface and the other surface, the rocking portion being electrically chargeable, and the one surface having a reflection surface for reflecting the laser beam;

a support portion, having one end portion and the other end portion, for rockably supporting the rocking portion, the one end portion being connected to the rocking portion;

a fixing member connected to the other end portion of the support portion and having an opposed portion opposed to the other surface of the rocking portion with a predetermined gap interposed;

first and second electrodes provided at positions on the opposed portion of the fixing member, which are symmetric with respect to the axis of rocking movement of the rocking portion; and a control unit for charging the first and second electrodes to have the same polarity and differing the potential differences of the first and second electrodes from that of the rocking portion, thereby electromagnetically moving the rocking portion about the axis of rocking movement.

According to a third aspect of the invention, there is provided an optical disk drive having a drive unit for driving a storage medium and an optical head, driven relative to the storage medium, for focusing a laser beam onto the storage medium, the optical head including a light source for emitting the laser beam, a galvanomirror for correcting a light passage of the emitted laser beam, a lens for focusing the laser beam from the galvanomirror onto the storage medium, and light receiving means for receiving the laser beam reflected by the storage medium, the galvanomirror comprising:

a rocking portion having one surface and the other surface, the rocking portion being electrically chargeable, and the one surface having a reflection surface for reflecting the laser beam;

a support portion, having one end portion and the other end portion, for rockably supporting the rocking portion, the one end portion being connected to the rocking portion;

a fixing member connected to the other end portion of the support portion and having an opposed portion opposed to the other surface of the rocking portion with a predetermined gap interposed; and an electrically chargeable electrode, provided on the opposed portion of the fixing member, for electrostatically driving the rocking portion, thereby reflecting the laser beam at a desired angle, wherein the support portion is shaped such that the length thereof in a direction parallel to the reflection surface of the rocking portion is less than the length thereof in a direction perpendicular to the reflection surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing a control system for a galvanomirror and a linear motor according to the first embodiment;

FIG. 11 is a perspective view showing the bottom surface of a first plate of a galvanomirror according to a third embodiment of the invention;

FIG. 12 is a perspective view showing the top surface of a second plate of a galvanomirror according to a fourth embodiment of the invention;

FIG. 13 is a perspective view showing the top surface of a second plate of a galvanomirror according to a fifth embodiment of the invention;

FIG. 14 is a perspective view showing a galvanomirror according to a sixth embodiment of the invention;

FIG. 33 is a perspective view of a galvanomirror according to a modification of the eighth embodiment of the invention;

FIG. 34 is a perspective view of a galvanomirror according to another modification of the eighth embodiment of the invention;

FIG. 35 is a perspective view of a galvanomirror according to a ninth embodiment of the invention;

FIG. 36 is a perspective view showing the bottom surface of a first plate of the galvanomirror according to the eighth embodiment;

FIG. 37 is a perspective view showing the top surface of a second plate of the galvanomirror according to the eighth embodiment;

FIG. 38 is a schematic view showing a modification of a rocking member according to the eighth embodiment;

FIG. 39 is a perspective view showing a galvanomirror according to a 10th embodiment of the invention; and FIG. 40 is a perspective view showing a galvanomirror according to an eleventh embodiment of the invention.

DETAILED DESCRIPTION OF THE PREFERRED EMBODIMENTS

Embodiments of the present invention will now be described with reference to the accompanying drawings.

Figure 1:
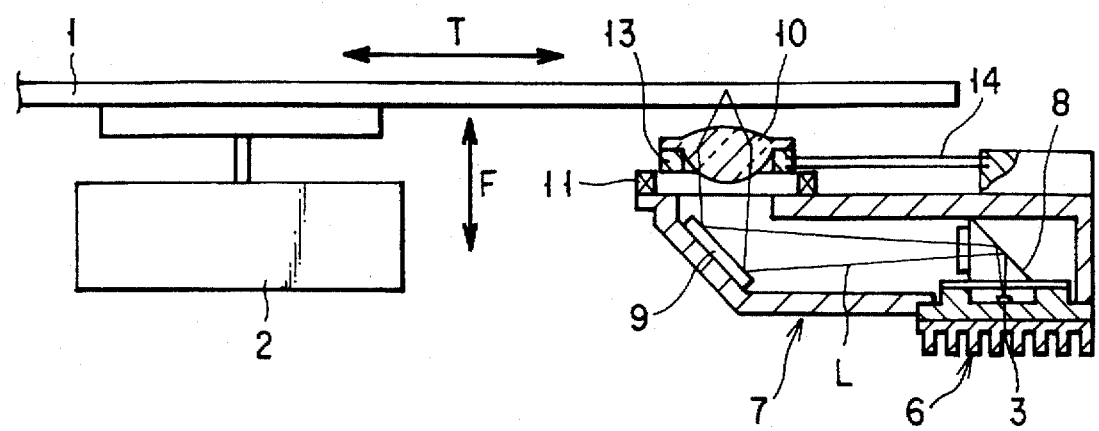
FIG. 1 is a cross-sectional view showing an optical disk apparatus according to a first embodiment of the present invention.
Figure 2:
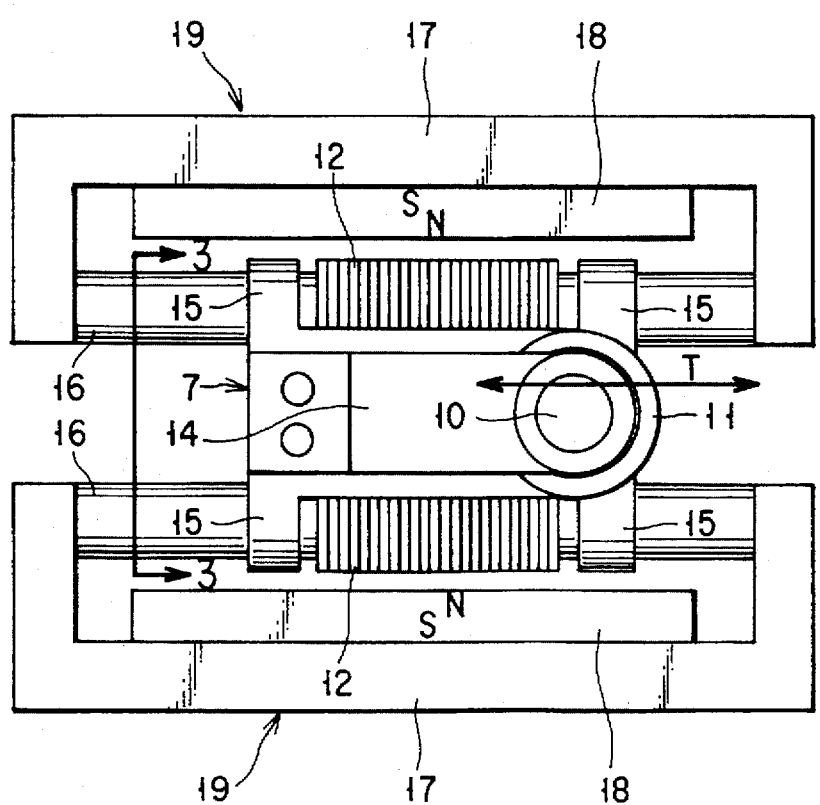
FIG. 2 is a plan view of a drive system including an optical head according to the first embodiment.
Figure 3:
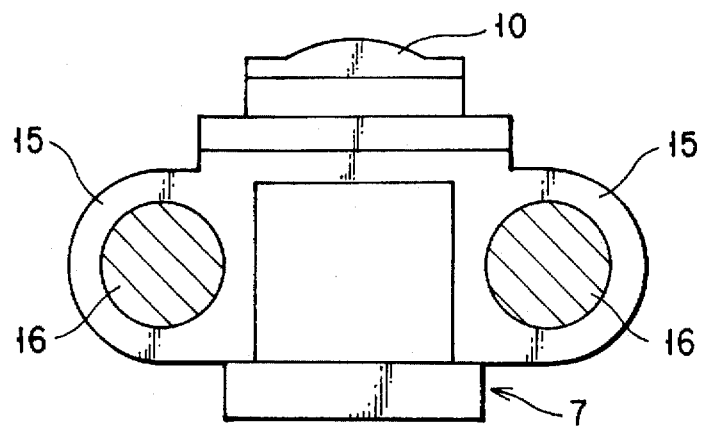
FIG. 3 is a rear view of the drive system including the optical head according to the first embodiment.
Figure 4:
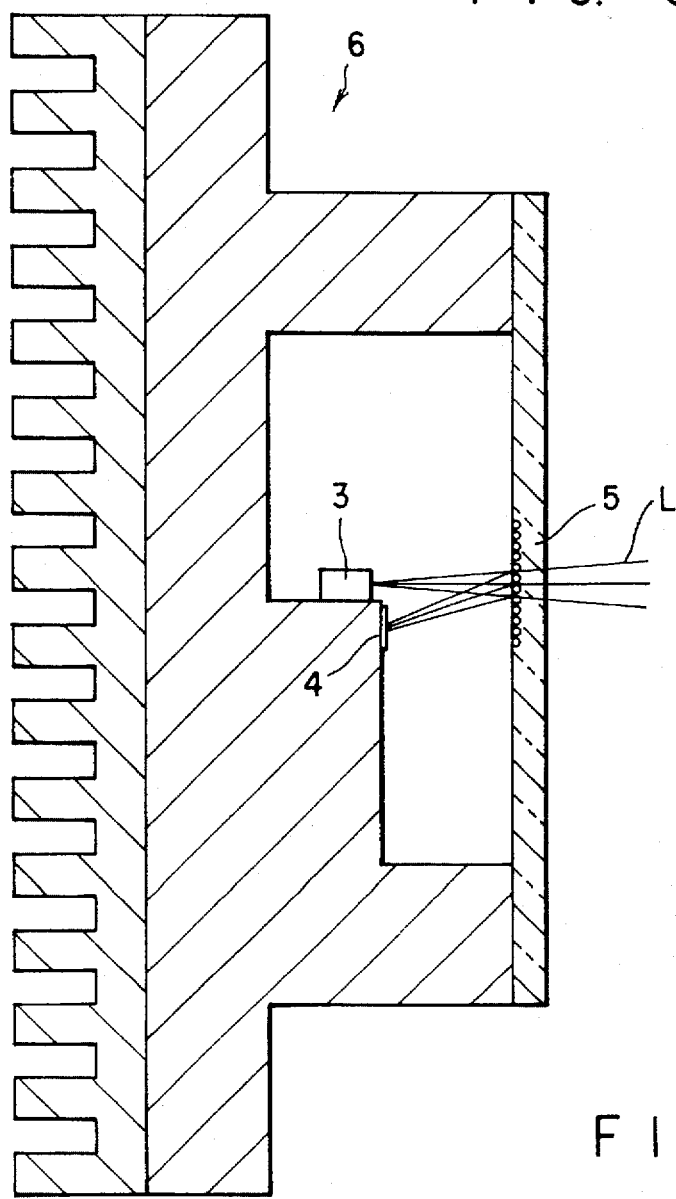
FIG. 4 is a cross-sectional view of an optical unit according to the first embodiment.

A first embodiment of the invention will first be described with reference to FIGS. 1 to 9. FIG. 1 is a cross-sectional view showing the internal structure of an optical disk apparatus. FIG. 2 is a plan view of a drive system including an optical head. FIG. 3 is a cross-sectional view of the optical head, taken along line 3—3 in FIG. 2, and FIG. 4 is a cross-sectional view showing an optical unit.

In FIG. 1, reference numeral 1 denotes a disk (e.g. an optical disk or a magnetooptic disk) serving as a recording medium for information recording/reproducing. The disk 1 is held by a spindle motor 2 fixed to a base (not shown) by chucking means such as a magnet chuck. The spindle motor 2 stably rotates the disk 1 during the recording or reproduction.

In FIG. 1, reference numeral 3 denotes a semiconductor laser for emitting a laser beam L to the disk 1. As is shown in FIG. 4, the semiconductor laser 3, along with a photodetector 4 and an HOE (Hologramic Optical Element) 5, constitutes an optical unit 6. The optical unit 6 is fixed to a lower part of the optical head 7, as shown in FIG. 1. The lower part of the optical unit 6 has irregularities for the purpose of improving heat radiation.

The laser beam L emitted from the semiconductor laser 3 is transmitted through the HOE 5 (see FIG. 4) formed on a glass plane and then guided to an objective lens 10 disposed on the upper part of the optical head 7, while the beam L changes its direction 90° by a prism 8 fixed on the opposite plate of the HOE 5 and changing its direction 90° again by a galvanomirror 9 (to be described later in greater detail). By virtue of the objective lens 10, the laser beam L is focused on a recording track of the disk 1.

The light reflected by the disk 1 is returned to the objective lens 10 and then guided to the HOE 5 via the galvanomirror 9 and prism 8. The light is deflected by the HOE 5, as shown in FIG. 4, and returned to the photodetector 4.

A recording information signal, a focus offset signal, a track offset signal and the like are generated from the light returned to the photodetector 4. A positional displacement of the objective lens 10 in the focus direction is detected on the basis of the focus offset signal. A control operation is carried out to cause a current to flow through a focus coil 11, thereby driving the objective lens 10 in the focus direction F so as to correct the positional displacement. On the basis of the track offset signal, a positional displacement of the objective lens 10 in the tracking direction T is detected, and a control operation is performed to apply a voltage to the galvanomirror 9 and linear motor coils 12 (shown in FIG. 2), thereby correcting the positional displacement in the tracking direction T. The control system for these control operations will be described later.

As is shown in FIG. 1, the objective lens 10 is held by an objective lens holder 13 constituted by a plastic magnet such that the lens 10 can move in the optical axis direction (focus direction F). One end portion of a parallel plate spring 14 is fixed to the holder 13, and the other end portion thereof is fixed to the optical head 7. Thus, the lens 10 is supported so as to be movable in its optical axis direction (focus direction F). An electromagnetic action is caused between the objective lens holder 13 constituted by the plastic magnet and the current flowing through the focus coil 11 wound around the optical head 7, thereby driving the objective lens 10 in the focus direction F.

As is shown in FIG. 2, the two linear motor coils 12 are cylindrically formed and fixed on both sides of the optical head 7. Two slide bearings 15 are formed so as to sandwich each of the linear motor coils 12 of the optical head 7 and engaged with an associated one of the two guide shafts 16 extending in the radial direction (tracking direction T) of the disk 1. Thereby, the optical head 7 is supported so that it can be moved in the tracking direction T.

The guide shafts 16 are formed of magnetic material and serve as yoke of a magnetic circuit. A back yoke 17 is fixed to both ends of each of the guide shafts 16. A radial magnet 18, which is situated opposite to each of the linear motor coils 12 with a magnetic gap therebetween, is fixed to the corresponding back yoke 17. The guide shafts 16, back yokes 17 and radial magnets 18 constitute radial magnetic circuits 19. The radial magnetic circuits 19 generate magnetic fields acting upon the linear motor coils 12. By the electromagnetic action between the magnetic fields and currents flowing in the linear motor coils 12, the optical head 7 is driven radially of the disk 1 (i.e. in the tracking direction T).

FIG. 5 is a block diagram illustrating the procedure of processing the track offset signal. The track offset signal is input to first and second filters. The first filter is a kind of low-pass filter. Thus, a signal output from the first filter has a low frequency and is supplied to a linear motor driver and linear motor coil 12. A signal output from the second filter has a high frequency and is supplied to a galvanomirror unit driver and galvanomirror 9. The thus processed signals are used as drive signal for driving the linear motor coil 12 and optical head 7, and are used as control signals for controlling the rocking angle of the galvanomirror 9.

Figure 6:
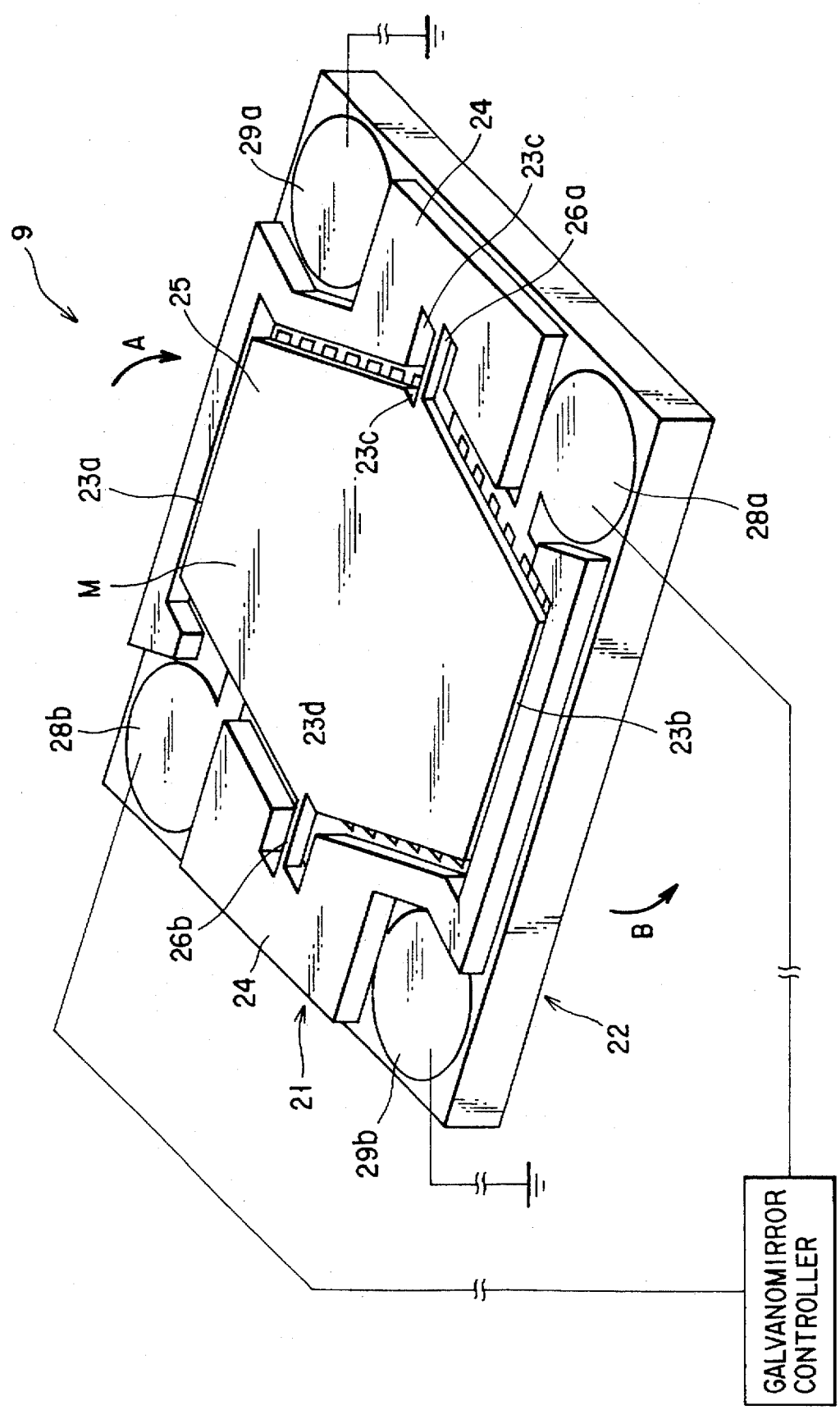
FIG. 6 is a perspective view showing the galvanomirror according to the first embodiment.
Figure 7:
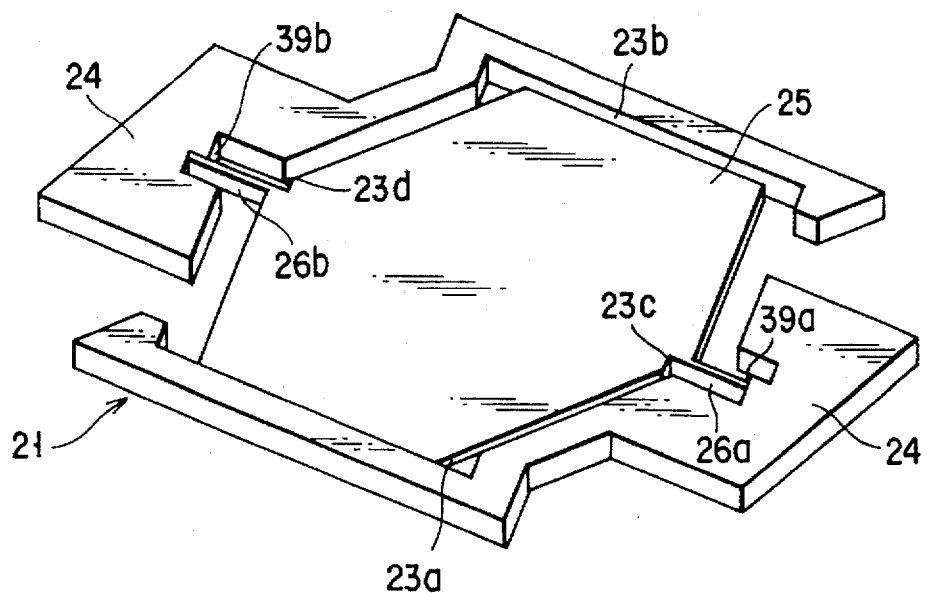
FIG. 7 is a perspective view of the bottom surface of a first plate according to the first embodiment.
Figure 8:
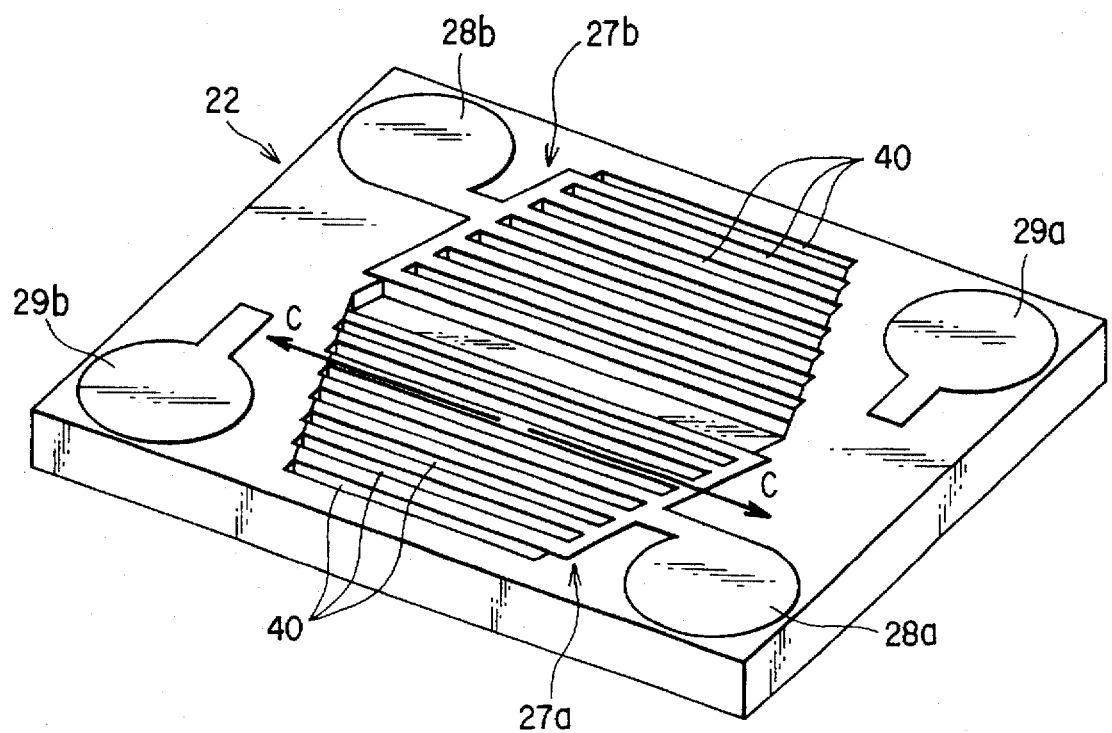
FIG. 8 is a perspective view of the top surface of a second mirror according to the first embodiment.

A specific structure of the galvanomirror 9 will now be described with reference to FIGS. 6 to 9. FIG. 6 is a perspective view showing the entire structure of the galvanomirror according to the first embodiment of the invention. FIG. 7 is a perspective view showing the bottom surface of a first plate of the galvanomirror, and FIG. 8 is a perspective view showing the top surface of a second plate of the galvanomirror.

The galvanomirror 9, as shown in FIG. 6, has a laminated structure of a first plate 21 and a second plate 22.

The first plate 21, as shown in FIG. 7, has two grooves 23a and 23b penetrating the plate 21 in its thickness direction. The grooves 23a and 23b divide the first plate 21 into fixing portions 24, a rocking portion 25 and two elastic portions (support portions) 26a and 26b. In addition, two grooves 23c and 23d are formed along a straight line connecting the two elastic portions 26a and 26b.

The fixing portions 24 constitute an outer peripheral portion of the first plate 21. When the fixing portions 24 are attached to the second plate 22, as shown in FIG. 6, the entire first plate 21 is thus fixed to the second plate 22.

The rocking portion 25 is designed to be surrounded by the outer peripheral portion of the first plate 21. The upper part of the rocking portion 25 is integrally provided with a mirror surface M for reflecting a laser beam from the semiconductor laser 3. The mirror surface M is formed by means of mirror processing, etc.

The elastic portions 26a and 26b are coupled at one end to the rocking portion 25 and at the other end to the associated fixing portions 24. Thus, the elastic portions 26a and 26b couple the rocking portion 25 and fixing portions 24 in a suspension manner. As is shown in FIG. 7, stepped portions 39a and 39b with a size of about 1 to 20 microns are formed on the bottom side of the first plate 21 at the regions of the elastic members 26a and 26b. Thereby, a space (or a gap) for permitting rocking movement of the rocking portion 25 is defined between the bottom surface of the rocking portion 25 and the second plate 22 (described later).

The center of mass of the rocking portion 25 is set near a middle point of a line connecting the two elastic portions 26a and 26b.

The fixing portions 24, rocking portion 25 and two elastic portions 26a and 26b, which constitute the first plate 21, are integrally formed by anisotropically etching a silicon-based semiconductor material. Following the etching, the stepped portions 39a and 39b are formed by a cutting process. The mirror surface M of the rocking portion 25 is finished by mirror processing, prior to the etching. The mirror-processed surface M may be replaced with a reflection mirror which is formed by depositing a metal thin film, a dielectric multilayer film, or the like on the surface of the rocking portion 25.

On the other hand, the second plate 22, as shown in FIG. 8, is formed of an electrically insulating material (e.g. glass plate material) or silicon coated with an electrically insulating material (or oxide film). The second plate 22 is coupled to the fixing portions 24 of first plate 21 by means of electrostatic bonding, diffusion bonding, anodizing bonding, etc. In addition, as shown in FIG. 8, tooth-shaped electrodes 27a and 27b extending in parallel to a line connecting the two elastic portions 26a and 26b are formed on that portion of the surface of the second plate 22, which faces the rocking portion 25 of first plate 21. A plurality of strip-like recess portions 40 are formed in the second plate 22 in those regions of the electrodes 27a and 27b, which exclude the tooth portions, that is, among the tooth portions. The depth of each recess portion 40 is about 10 microns to 200 microns.

The electrodes 27a and 27b are electrically connected to terminals 28a and 28b.

The second plate 22 is also provided with terminals 29a and 29b. The terminals 29a and 29b are so shaped as to come into partial contact with the bottom surfaces of the fixing portions 24 of first plate 21 when the first plate 21 is superposed on the second plate 22, as shown in FIG. 6. The terminals 29a and 29b are grounded.

As is shown in FIG. 6, the electrodes 27a and 27b and terminals 28a and 28b are formed so as not to come into electrical contact with the first plate 21. Specifically, the electrodes 27a and 27b are situated in the above-mentioned space (with the size of about 1 to 20 microns) provided on the first plate (21) side by means of the stepped portions 39a and 39b. Besides, the terminals 28a and 28b are shaped and situated so as not to come into contact with the first plate 21, as shown in FIG. 6.

The cross-sectional shape of each of elastic portions 26a and 26b is determined such that the length thereof in a direction parallel to the reflection mirror surface formed on the rocking portion 25 is less than the length thereof in a direction perpendicular to the reflection mirror surface M.

The cross-sectional shape of each elastic portion 26a, 26b may be uniform along the longitudinal axis thereof. Alternatively, such a cross-sectional shape may be applied only to at least parts of the elastic portions 26a and 26b. The aspect ratio of the cross-sectional shape can be freely set so as to meet the above condition.

It is desirable to select materials having substantially equal thermal expansion coefficients be used as those of the first and second plates 21 and 22.

The galvanomirror 9 of this embodiment with the above-described structure is firmly mechanically fixed to the inside of the optical head 7, as shown in FIG. 1. Power supply terminals (not shown) provided on the optical head 7 are electrically connected to the terminals 28a and 28b of the galvanomirror 9 by means of soldering, etc.

Figure 9A:
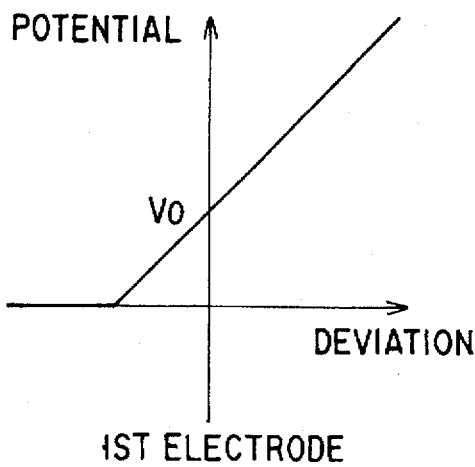
FIG. 9A is a graph showing the potential of an electrode for electrostatically driving a rocking member of the galvanomirror according to the first embodiment.
Figure 9B:
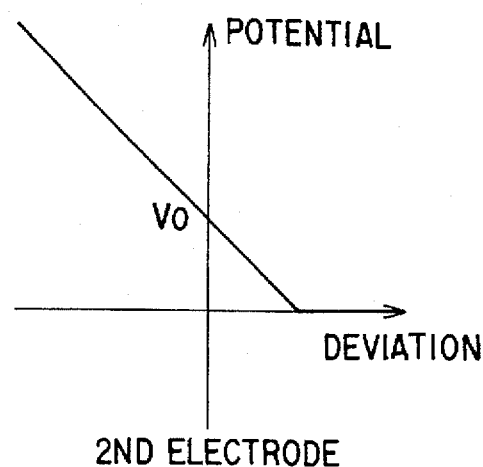
FIG. 9B is a graph showing the potential of an electrode for electrostatically driving the rocking member of the galvanomirror according to the first embodiment.

A specific method of driving the galvanomirror 9 of the present invention will now be described with reference to FIGS. 9A and 9B. FIG. 9A shows a potential to be applied to the electrode 27a, and FIG. 9B shows a potential to be applied to the electrode 27b.

The electrodes 27a and 27b are supplied via the terminals 28a and 28b with an equal, negative potential $V_0$. In this case, the attraction force produced by the electrode 27a is balanced with the attraction force produced by the electrode 27b, a torque acting about the axis of rotation of the rocking portion 25 is not produced.

When a torque for rotating the rocking portion 25 is produced, the potential of electrode 27a is made higher than $V_0$ by dV, and the potential of electrode 27b is made lower than $V_0$ by dV inversely. Consequently, the attraction force produced by the electrode 27a and that produced by the electrode 27b are unbalanced, and a torque for rotating the rocking portion 25 occurs. Thus, the two elastic portions 26a and 26b are distorted and the rocking portion 25 is rotated in a direction B in FIG. 6 (i.e. in a direction toward the electrode 27a).

When the rocking portion 25 is rotated in an opposite direction (direction A), the potential of electrode 27a is made lower than $V_0$ by dV, and the potential of electrode 27b is made higher than $V_0$ by dV. The value dV in this case is set at a value proportional to a torque necessary for rotating the rocking portion 25.

If dV becomes greater than $V_0$ (i.e. dV=2 $V_0$), the potential of the electrode, which is lower than that of the other electrode, is set at 0, as shown in FIGS. 9A and 9B, and a potential of opposite sign is applied. If the potential of opposite sign is applied, the polarity of the rocking portion 25 becomes equal to that of the electrode 28 or electrode 29 and no attraction force is produced.

It is desirable that the value $V_0$ be set to be higher than the value dV necessary for normal tracking operation (i.e. for reflection angle control by means of the galvanomirror in order to assist the linear motor coils 12 in positioning the objective lens 10 in the tracking direction). Thereby, a linear relationship between the potential and deviation is maintained at the time of tracking operation.

By adopting the above electrode control method, static displacement in a direction perpendicular to the reflection mirror surface M, as well as dynamic rotational displacement, occurs. On the other hand, no dynamic displacement in the direction perpendicular to the reflection mirror surface M is caused. Thus, a high-precision tracking operation is maintained during signal recording/ reproducing, and good recording/reproducing characteristics can be obtained.

In addition, by setting the maximum application voltage to be higher than the initial potential, the allowable range of tracking can be increased at the time of the end of seek.

In the above embodiment, the electrode 27a and electrode 27b are charged with negative (−) electricity. However, even if the electrode 27a and electrode 27b are charged with positive (+) electricity, the same advantage is obtained.

If the capacitance between the rocking portion 25 and the electrode 27a, 27b is measured, the gap length between the rocking portion 25 and second plate 22 can be detected. Thereby, the rotational (rocking) angle of the rocking portion 25 can be exactly detected. By electrically correcting the tracking offset on the basis of the detection value, it becomes possible to substantially ignore the limitation of rotational angle peculiar to the galvanomirror. Therefore, a stable and precise tracking control can be performed.

In addition, by measuring the variation of the gap length on the basis of the capacitance, the inclination of the mirror surface due to temperature increase or passing of time can be corrected.

The galvanomirror 9 with this structure does not comprise elements with large mass such as a yoke, a magnet and a coil. Thus, the mass of the galvanomirror 9, as compared to a conventional one, is remarkably reduced. Even if the optical head 7 is loaded with the galvanomirror 9, the optical head 7 can be kept light and small and a quick seek of the optical head 7 can be achieved.

In particular, in the present invention, the strip-like recesses 40 are provided substantially in parallel to the straight line connecting the two elastic portions 26a and 26b. When the rocking angle of the reflection mirror is to be controlled with high precision, it is necessary to drive the rocking portion 25 quickly. In this case, viscous resistance of air acting in the gap between the rocking portion 25 and second plate 22 cannot be ignored. The viscous resistance has such a pressure distribution that the pressure increases gradually in the direction C in FIG. 8. Owing to the variation in pressure, the air flows in the direction C. Thus, the recess portions 40 can change the direction of the flow of air to a direction perpendicular to the direction of pressure distribution, and the adverse affect due to the pressure distribution in the direction C can be greatly decreased. Therefore, the rocking portion 25 can be moved with maximum efficiency.

The recess portions 40 may be provided on the bottom surface of the rocking portion 25, as a matter of course. However, when the rocking portion 25 is formed relatively thin, the formation of the recess portions is difficult. Even in such a case, adequate advantage can be attained only if the second plate 22 is provided with recess portions 40.

Since the mirror surface M is directly formed on the rocking portion 25 itself without using an adhesive or the like, the rotational drive force acts on the mirror surface M directly. Accordingly, the resonance frequency of the resonance mode in which the phase exceeds 180° can be increased. As a result, a high-precision tracking control can be performed, and the optical disk drive of this embodiment can be applied to optical disks with a narrow track pitch. Therefore, the recording density can be increased.

Since the driving force is produced by making use of electrostatic power, the power consumption can be saved and a thermal adverse affect upon the optical unit 6 and objective lens 10 mounted on the optical head 7 can be avoided as much as possible.

In addition, in the present invention, the objective lens 10 is driven by the galvanomirror 9 comprising an electrostatic driving element which requires no electromagnetic force, like electromagnetic driving elements such as a coil and a magnet. Thus, interference of driving forces due to the use of electromagnetic power and electrostatic power can be prevented almost completely. Accordingly, an adverse affect resulting from mounting the galvanomirror 9 on the optical head 7 can be eliminated, and the galvanomirror 9 and objective lens 10 can be situated close to each other (for example, just below the objective lens as shown in FIG. 1). The degree of freedom of apparatus design is remarkably improved. Besides, displacement of the optical axis at the objective lens due to the rocking of the galvanomirror can be prevented. As a result, the degree of offset occurring in the tracking and focusing control signals can be reduced, and the position of the beam spot can be determined precisely.

In the present invention, no medium such as adhesive is used to couple to the first plate 21 and second plate 22. Thus, a produced torque is not transmitted through an adhesive layer, and the resonance frequency can be set at a very high level. Specifically, since the drive frequency characteristics of the galvanomirror are not degraded due to deficiency in rigidity of the coupling portion (for example, because of a resonance point of about 20 KHz, a servo operation cannot be performed at a high frequency region), it is very easy to perform a control operation in a high frequency band. Therefore, a high-precision positioning operation can be performed.

The rotational axis of the rocking portion 25 substantially coincides with the longitudinal direction of each elastic portion 26a, 26b, and the center of mass of the rocking portion 25 (movable portion) is set at a substantially middle point on the line connecting the two elastic portions 26a and 26b. Thus, even if a disturbing acceleration acts on the apparatus, the rotation of the rocking portion 25 is not adversely affected.

Besides, since the terminals 29a and 29b are grounded, the rocking portion 25 is not charged with static electricity. A floating contaminant, such as dust, does hardly adhere to the reflection mirror, and the performance of the galvanomirror 9 is maintained for a long time.

In the above embodiment, the second plate 22 is formed of an electrically insulating material such as glass. Instead, an insulating layer of an oxide film may be provided on the surface of, e.g. a silicon-based semiconductor material. With this structure, too, the same advantage can be obtained.

In this case, if the surface of the second plate 22, which is parallel to the reflection mirror surface, is formed as (110) plane and the portions to be provided with the electrodes 27a and 27b are etched in groove shapes to have a lower level than the portions to be coupled to the first plate 21, the electrodes 27a and 27b can maintain a high degree of parallelism with respect to the reflection mirror surface. The reason is that the (110) plane of a covalent bond of silicon tends to be anisotropically etched, with the parallelism of each of layers of atoms being maintained.

Similarly, the two grooves 23c and 23d and recess portions 40 are processed to be parallel to the (111) plane of silicon. Accordingly, while the elongated elastic portions 26a and 26b and recess portions 40 are processed, the plane thereof does not become irregular and no burr-like etched portions will form. Since the possibility of breakage of elastic portions 26a and 26b and recess portions 40 due to concentration of stress or a load decreases, a product with high resistance to shock can be manufactured. Furthermore, the elastic portions 26a and 26b and recess portions 40 themselves can be processed more finely.

A second embodiment of the present invention will now be described. In the description of the following embodiments, the structural elements common to those of the first embodiment are denoted by like reference numerals, and a description thereof is omitted.

Figure 10:
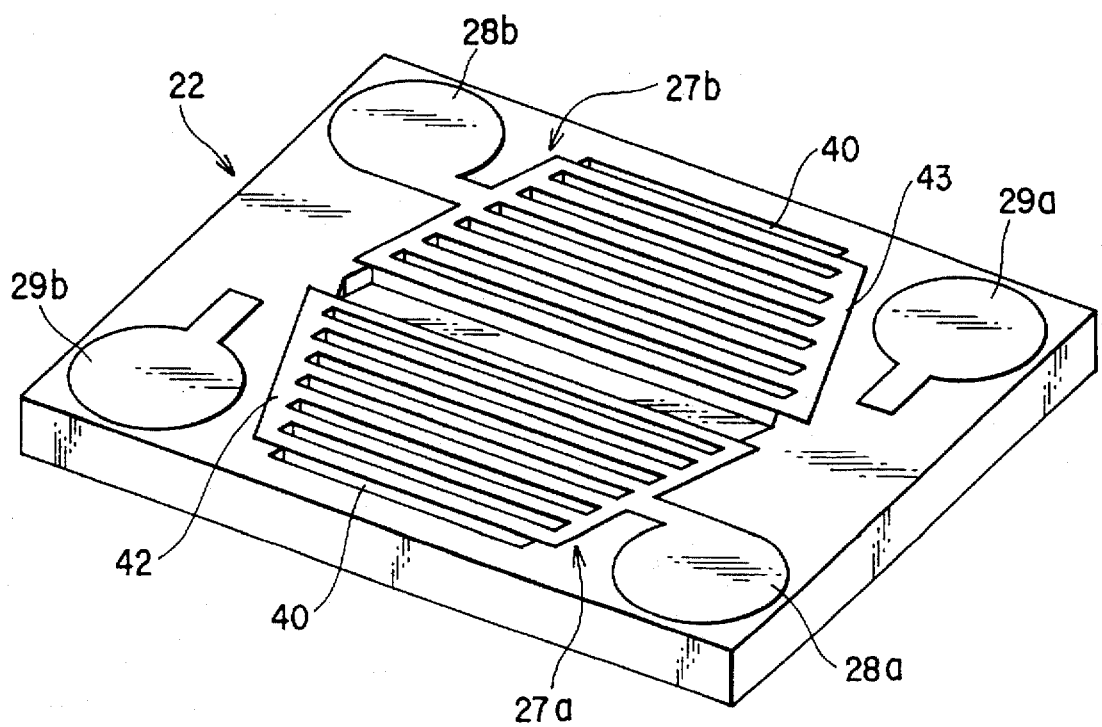
FIG. 10 is a perspective view showing the top surface of a second plate of a galvanomirror according to a second embodiment of the invention.

FIG. 10 is a perspective view showing the top surface of the second plate 22 of a galvanomirror according to the second embodiment of the invention. The second embodiment differs from the first embodiment in the shape of end portions 42 and 43 of the electrodes 27a and 27b. The electrodes 27a and 27b of this embodiment are not opened, like teeth of a comb, at one end. The electrodes 27a and 27b, as a whole, are formed in closed shapes by the end portions 42 and 43.

With the galvanomirror 9 of this structure, too, the same advantage as with the first embodiment can be obtained.

A third embodiment of the invention will now be described. FIG. 11 is a perspective view showing the bottom surface of the first plate 21 of a galvanomirror according to the third embodiment. The third embodiment differs from the first embodiment in the shape of the bottom surface of the rocking portion 25. Specifically, a plurality of grooves 44 are cut in the bottom surface of the rocking portion 25. The grooves 44 extend in a direction perpendicular to the recesses 40. However, the grooves 44 may not necessarily be perpendicular to the recesses 40. It suffices if the grooves 44 extend in a direction crossing the recesses 40.

When the rocking portion 25 is formed of a silicon wafer about 5 microns to 200 microns thick, deep grooves like recesses 40 cannot actually be formed in the rocking portion 25 since they would penetrate to the reflection mirror surface M. Thus, the depth of grooves 44 is made sufficiently less than the thickness of the rocking portion 25.

According to this embodiment having the above structure, the grooves 44 have functions similar to those of the recesses 40 and can act upon the flow of air in direction D in FIG. 11 which is produced by slight movement of the rocking portion 25. Thus, a pressure distribution in a direction 90° different from the direction of recesses 40 can be reduced, and the rocking movement can be further facilitated.

In this embodiment, the recesses 44 are formed in such a direction as to have relatively high rigidity against deformation due to rocking movement of the rocking portion 25 (i.e. bending deformation about the axis of rocking movement). Therefore, the stable control operation of the galvanomirror 9 can be ensured.

A fourth embodiment of the invention will now be described. FIG. 12 is a perspective view showing the top surface of the second plate 22 of a galvanomirror according to the fourth embodiment of the invention. The fourth embodiment differs from the second embodiment in the shape of the electrodes 27a and 27b. Although the electrodes 27a and 27b are shaped like teeth of combs, their longitudinal axes do not coincide with the axis of rocking movement, as shown in FIG. 12. The electrodes 27a and 27b are curved outward away from the axis of rocking movement.

According to the fourth embodiment with this structure, the direction of extension of the teeth portions of the electrodes 27a and 27b is defined by both vector components in the direction of the axis of rocking movement and in a direction perpendicular to the direction of the axis of rocking movement. Thus, the fourth embodiment has combined effects of the first embodiment (FIG. 8) and the third embodiment (FIG. 11). In this case, since the recesses need not be provided on the rocking portion 25, the rocking portion 25 can be further thinned.

A fifth embodiment of the invention will now be described. FIG. 13 is a perspective view showing the top surface of the second plate 22 of a galvanomirror according to the fifth embodiment of the invention. The fifth embodiment differs from the second embodiment in the shape of the electrodes 27a and 27b. The electrodes 27a and 27b of this embodiment are provided with notches 45 in a direction perpendicular to the axis of rocking movement. In addition, those portions of the second plate 22, which correspond to the notches 45, are provided with grooves.

The fifth embodiment, like the fourth embodiment, has combined effects of the first embodiment and the third embodiment.

Needless to say, the same advantage can be obtained even if such recesses 44 as provided in the third embodiment are formed on the rocking portion 25, and the notches 45 are provided on the second plate 22.

A sixth embodiment of the invention will now be described.

The structure of the optical disk drive according to the sixth embodiment is the same as that of the optical disk drive according to the first embodiment, except for the galvanomirror. Thus, the structure of the galvanomirror alone will be described.

Figure 15:
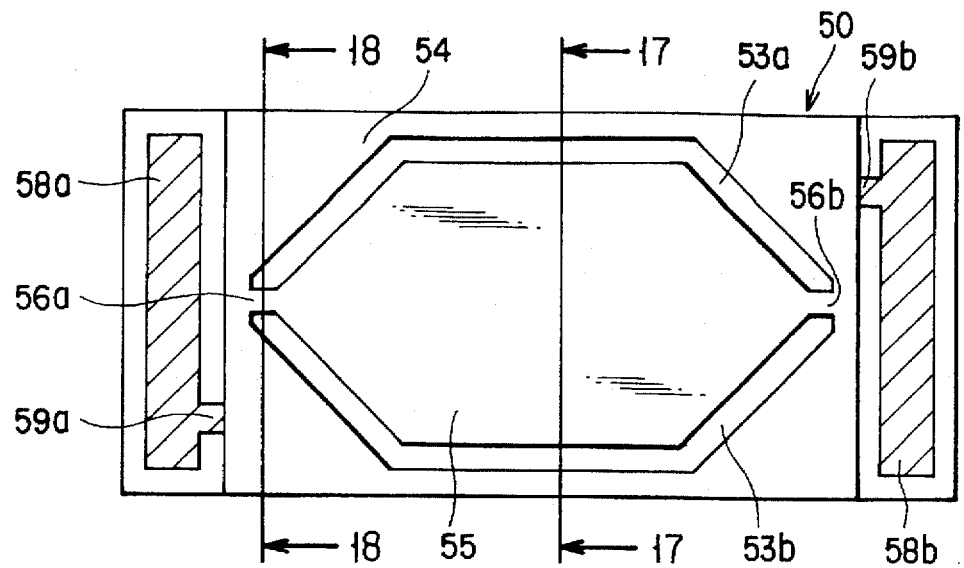
FIG. 15 is a plan view of the galvanomirror according to the sixth embodiment.
Figure 16:
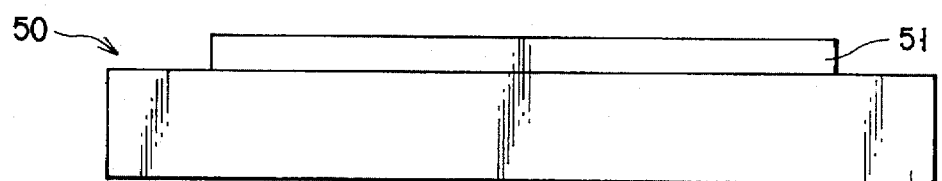
FIG. 16 is a side view of the galvanomirror according to the sixth embodiment.
Figure 17:
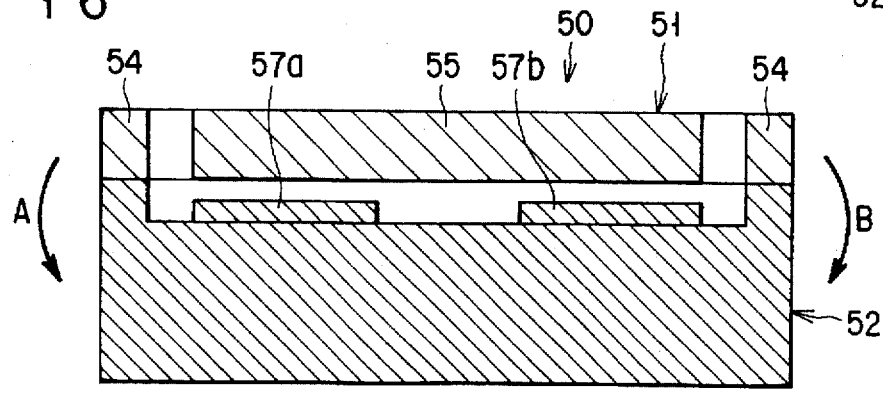
FIG. 17 is a cross-sectional view taken along line 17—17 in FIG. 15.
Figure 18:
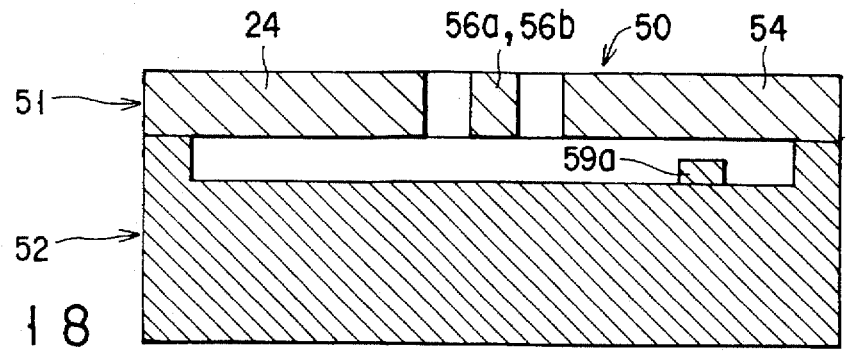
FIG. 18 is a cross-sectional view taken along line 18—18 in FIG. 15.
Figure 19:
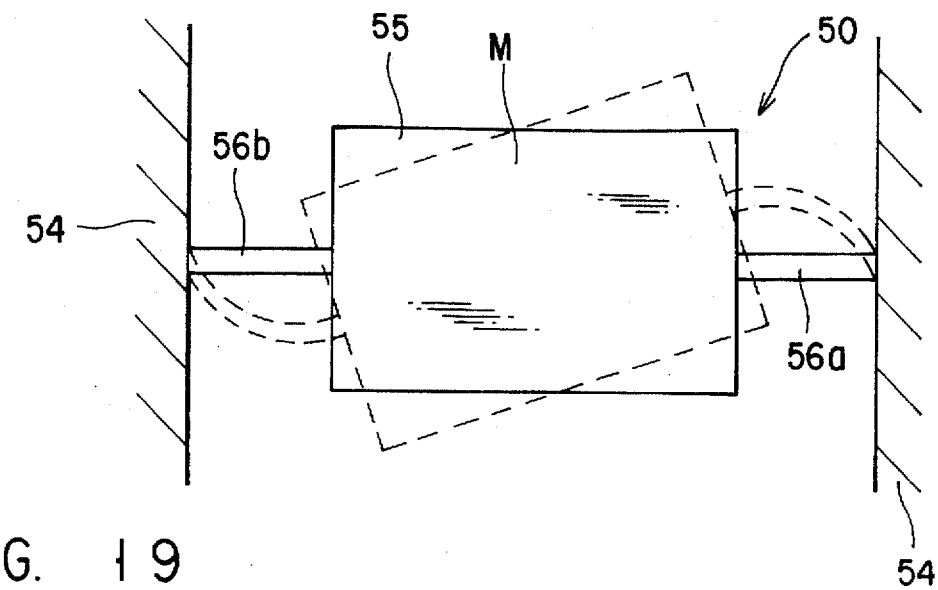
FIG. 19 is a schematic view illustrating the operation of the galvanomirror according to the sixth embodiment.

FIG. 14 is a perspective view showing a galvanomirror 50 according to the sixth embodiment of the invention, FIG. 15 is a plan view of the galvanomirror 50, FIG. 16 is a side view of the galvanomirror 50, FIG. 17 is a cross-sectional view taken along line 17—17 in FIG. 15, FIG. 18 is a cross-sectional view taken along line 18—18 in FIG. 15, and FIG. 19 is a schematic view illustrating the operation of the galvanomirror 50. The galvanomirror 50 is situated at the same location as the galvanomirror 9 of the first embodiment in the optical disk drive shown in FIG. 1.

The galvanomirror 50, as shown in FIGS. 14, 18 and 19, has a laminated structure of a first plate 51 and a second plate 52.

The first plate 51 has two grooves 53a and 53b. The grooves 53a and 53b divide the first plate 51 into a fixing portion 54, a rocking portion 55 and two elastic portions (support portions) 56a and 56b.

The fixing portion 54 constitute an outer peripheral portion of the first plate 51. When the fixing portion 54 is attached to the second plate 52, the entire first plate 51 is thus fixed to the second plate 52.

The rocking portion 55 is designed to be surrounded by the outer peripheral portion (fixing portion 54) of the first plate 51. The upper part of the rocking portion 55 is integrally provided with a mirror surface M for reflecting a laser beam from the semiconductor laser 3 (see FIG. 1). The mirror surface M is formed by means of mirror processing, etc.

The elastic portions 56a and 26b are coupled at one end to the rocking portion 55 and at the other end to the fixing portion 54. Thus, the elastic portions 56a and 56b couple the rocking portion 55 and fixing portion 54 in a suspension manner.

The center of mass of the rocking portion 55 (movable portion) is set near a middle point of a line connecting the two elastic portions 56a and 56b.

The fixing portion 54, rocking portion 55 and two elastic portions 56a and 56b, which constitute the first plate 51, are integrally formed by anisotropically etching a silicon-based semiconductor material. Although the mirror surface M of the rocking portion 55 is formed by mirror processing, the mirror-processed surface M may be replaced with a reflection mirror which is formed by depositing a metal thin film, a dielectric multi-layer film, or the like on the surface of the rocking portion 55.

On the other hand, the second plate 52 is formed of an electrically insulating material (e.g. glass plate material) or silicon coated with an electrically insulating material (or oxide film). The second plate 52 is coupled to the fixing portion 54 of first plate 51 by means of electrostatic bonding, diffusion bonding, anodizing bonding, etc. In addition, as shown in FIG. 17, electrodes 57a and 57b are formed on that portion of the second plate 52, which faces the rocking portion 55, in a line-symmetrical fashion with respect to a line connecting the two elastic portions 56a and 56b.

The portion of the second plate 52, where the electrodes 57a and 57b are provided, is formed in a recessed shape at a level lower than the portion coupled to the fixing portion 54. A space or a gap of about 1 micron to 7 microns is provided between the electrodes 57a and 57b and the rocking portion 55.

As is shown in FIG. 15, the electrodes 57a and 57b are electrically connected via wiring elements 59a and 59b to terminals 58a and 58b provided on both end portions of the second plate 52. The electrodes 57a and 57b can be externally electrified to a desired polarity via the terminals 58a and 58b.

As is shown in FIG. 18, the cross-sectional shape of the elastic portion 56a is determined such that the length thereof in a direction parallel to the reflection mirror surface M formed on the rocking portion 55 is less than the length thereof in a direction perpendicular to the reflection mirror surface M. The cross-sectional shape of the elastic portion 56b is determined similarly.

The cross-sectional shape of each elastic portion 56a, 56b may be uniform along the longitudinal axis thereof. Alternatively, such a cross-sectional shape may be applied only to at least parts of the elastic portions 56a and 56b. The aspect ratio of the cross-sectional shape can be freely set so as to meet the above condition.

It is desirable to select materials having substantially equal thermal expansion coefficients be used as those of the first and second plates 51 and 52.

The galvanomirror 50 of this embodiment having the above structure is fixed on the optical head 7 (see FIG. 1) at the same position as the galvanomirror 9 of the first embodiment. In addition, the electrodes 58a and 58b are electrically connected to terminals (not shown) provided on parts of the optical head 7 by means of soldering, etc.

As is shown in FIG. 18, the cross-sectional shape of the elastic portion 56a, 56b is determined such that the length thereof in a direction parallel to the reflection mirror surface M of the rocking portion 55 is less than the length thereof in a direction perpendicular to the reflection mirror surface M. In other words, in FIG. 18, the vertical length of the elastic portion 56a, 56b is greater than the horizontal length thereof. The advantage resulting from this structure will now be described with reference to FIG. 19.

Suppose that there is a slight difference in thermal expansion coefficient between the first plate 21 and second plate 22 due to a difference in their material characteristics. In this case, in the galvanomirror of this invention, as shown in FIG. 19, a compressive stress or a tensile stress acts in the axial direction of the elastic portions 56a and 56b. As a result, the rocking portion 55 deforms or rotates about an axis normal to the mirror surface M (i.e. in a direction perpendicular to the surface of the sheet of FIG. 19). It is obvious that the rotation of the rocking portion 55 about the axis normal to the mirror surface M does not adversely affect the direction of the reflection light (optical axis). Thus, if the galvanomirror 50 of this invention is adopted, there is no adverse affect of thermal deformation due to a difference in material characteristics and a great practical advantage is obtained.

A specific method of driving the galvanomirror according to this sixth embodiment will now be described.

Although the galvanomirror according to this embodiment can be driven by the same method as is adopted in the first embodiment in which the potential of electrode 27a, 27b is preset at $V_0$, another method is adopted in the sixth embodiment.

For example, the rocking portion 55 formed semiconductor is charged with positive (+) electricity, the electrode 57a is charged with negative (−) electricity, and the electrode 57b is charged with positive (+) electricity. Consequently, the attraction force produced by the electrode 57a to pull the rocking portion 55 and that produced by the electrode 57b to pull the rocking portion 55 are unbalanced, and a torque for rotating the rocking portion 55 occurs. Thus, the two elastic portions 56a and 56b are distorted and the rocking portion 55 is rotated in a direction A in FIG. 17. Inversely, if the rocking portion 55 charged with positive (+) electricity, the electrode 57a is charged with positive (+) electricity, and the electrode 57b is charged with negative (−) electricity, the two elastic portions 56a and 56b are distorted and the rocking portion 55 is rotated in a direction B in FIG. 17.

In the above example, the rocking portion 55 is charged with positive (+) electricity and the electrode 57a or 57b is charged with negative (−) electricity. However, the same advantage is obtained even if the rocking portion 55 is charged with negative (−) electricity and the electrode 57a or 57b is charged with positive (+) electricity.

As has been described above, if the rocking member 55 is grounded and set at zero potential, like the first embodiment, the same advantage is obtained even if both electrodes 57a and 57b are charged with positive (+) electricity or with negative (−) electricity.

Needless to say, this driving method of the sixth embodiment can be applied to the first embodiment.

If the capacitance between the rocking portion 55 and the electrode 57a, 57b is measured, the gap length between the rocking portion 55 and second plate 52 can be detected. Thereby, the rotational (rocking) angle of the rocking portion 55 can be exactly detected. By electrically correcting the tracking offset on the basis of the detection value, it becomes possible to substantially ignore the limitation of rotational angle peculiar to the galvanomirror. Therefore, a stable and precise tracking control can be performed.

In addition, by measuring the variation of the gap length on the basis of the capacitance, the inclination of the mirror surface due to temperature increase or passing of time can be corrected.

The galvanomirror 50 having the above structure has substantially the same advantage as the first embodiment. In addition, as stated above, the galvanomirror has the great practical advantage in that there is no adverse affect of thermal deformation due to a difference in material characteristics of the galvanomirror 50.

In the above-described sixth embodiment, the second plate 52 is formed of an electrically insulating material such as glass. Instead, an insulating layer of an oxide film may be provided on the surface of, e.g. a silicon-based semiconductor material. With this structure, too, the same advantage can be obtained.

In this case, if the surface of the second plate 52, which is parallel to the reflection mirror surface, is formed as (110) plane and the portions to be provided with the electrodes 57a and 57b are etched in groove shapes to have a lower level than the portions to be coupled to the first plate 51, the electrodes 57a and 57b can maintain a high degree of parallelism with respect to the reflection mirror surface M. The reason is that the (110) plane of a covalent bond of silicon tends to be anisotropically etched, with the parallelism of each of layers of atoms being maintained.

Methods of fabricating the galvanomirror 50 of the sixth embodiment will now be described. In the following, no description is given of the structural elements of the galvanomirror 50 which have already been described.

Figure 20A:
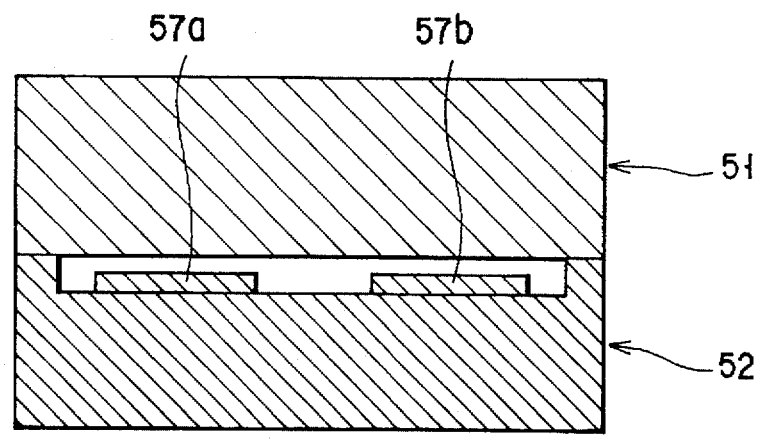
FIGS. 20A and 20B are cross-sectional views of the galvanomirror for illustrating a first example of a process for fabricating a galvanomirror according to the sixth embodiment.

A first method of fabricating the galvanomirror 50 will be described with reference to FIGS. 20A and 20B.

As the size of the galvanomirror 50 formed substantially of silicon decreases, the driving sensitivity thereof increases. A very thin silicon wafer material (e.g. 100 microns or less), however, is needed to fabricate the galvanomirror 50 with the size required in this invention (e.g. about 3×4 mm to 2×3 mm). In addition, the handling and acquisition of silicon wafer material with a thickness of 100 microns or less is very difficult.

In order to obviate these problems, the following method is adopted in the present invention. As is shown in FIG. 20A, end portions of the second plate 52 having electrodes 57a and 57b on its upper surface are coupled to the first plate 51 of silicon wafer by means of electrostatic bonding. The first plate 51, in this case, may have a thickness of a commonly available silicon wafer.

Figure 20B:
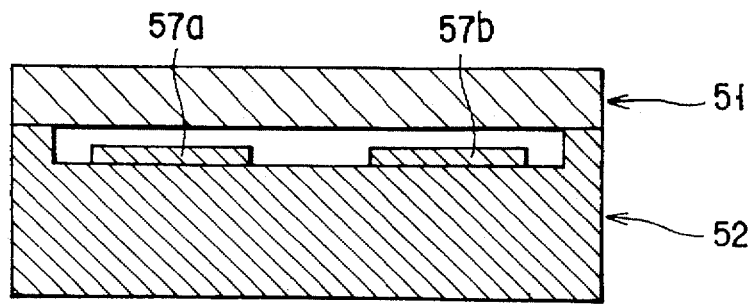

Then, as shown in FIG. 20B, the upper surface of the first plate 51 is polished to a desired thickness. Subsequently, the rocking portion 55 and elastic portions 56a and 56b, as shown in FIGS. 14 and 15, are formed by means of anisotropic etching.

Through the above steps, desired galvanomirror 50 can be fabricated relatively easily even if a silicon wafer with a proper thickness cannot be obtained as material of the first plate 51. In the above steps, when the second plate 52 is coupled to the first plate 51 by means of electrostatic bonding, the reflection mirror surface M of the rocking portion 55 may be damaged and warped. The mirror surface M, however, can be polished and smoothed so that the mirror surface precision of the reflection mirror M can be efficiently enhanced.

A second method of fabricating the galvanomirror 50 of the sixth embodiment will now be described with reference to FIGS. 21A and 21B.

The second method differs from the first method (FIGS. 20A and 20B) in that when the first plate 51 of silicon wafer is coupled to the second plate 52 having electrodes 57a and 57b by means of electrostatic coupling, wax 60 is filled between the first plate 51 and second plate 52.

Figure 21B:
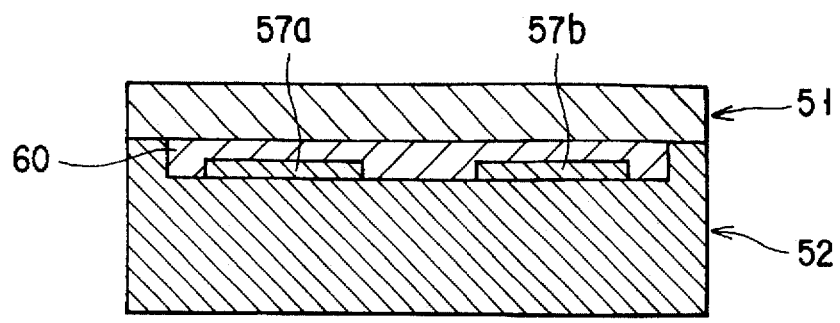
FIGS. 21A and 21B are cross-sectional views of the galvanomirror for illustrating a second example of the process for fabricating the galvanomirror according to the sixth embodiment.
Figure 21A:
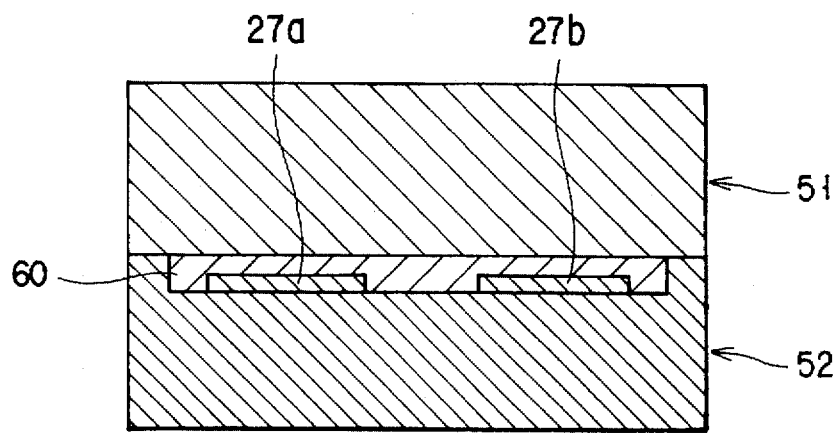

The wax 60 filled between the first plate 51 and second plate 52, as shown in FIG. 21A, is melted and removed in a heating step following the polishing and etching steps (FIG. 21B). Thus, the galvanomirror 50 is completely fabricated.

According to the sixth embodiment adopting the above manufacturing steps, the possibility of deformation or warp of the mirror surface M of second plate 52 is reduced in the polishing step and the galvanomirror with higher precision can be obtained.

A seventh embodiment of the galvanomirror of the present invention will now be described. The basic structure of the seventh embodiment is the same as that of the sixth embodiment, and common parts are denoted by like reference numerals without describing them.

Figure 22:
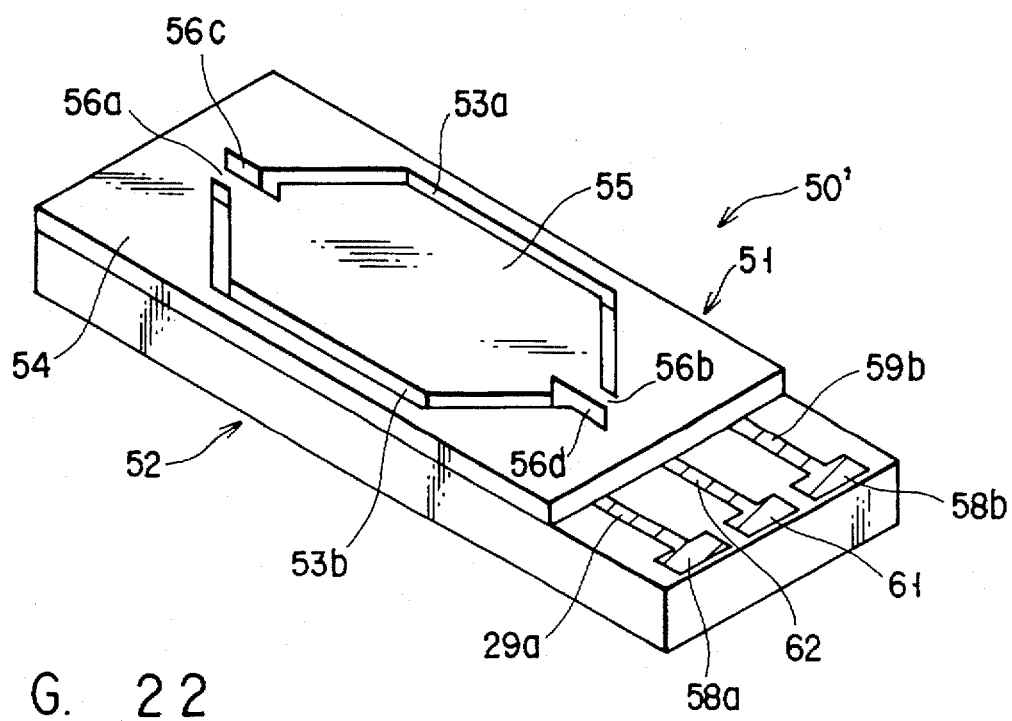
FIG. 22 is a perspective view of a galvanomirror according to a seventh embodiment of the present invention.
Figure 23:
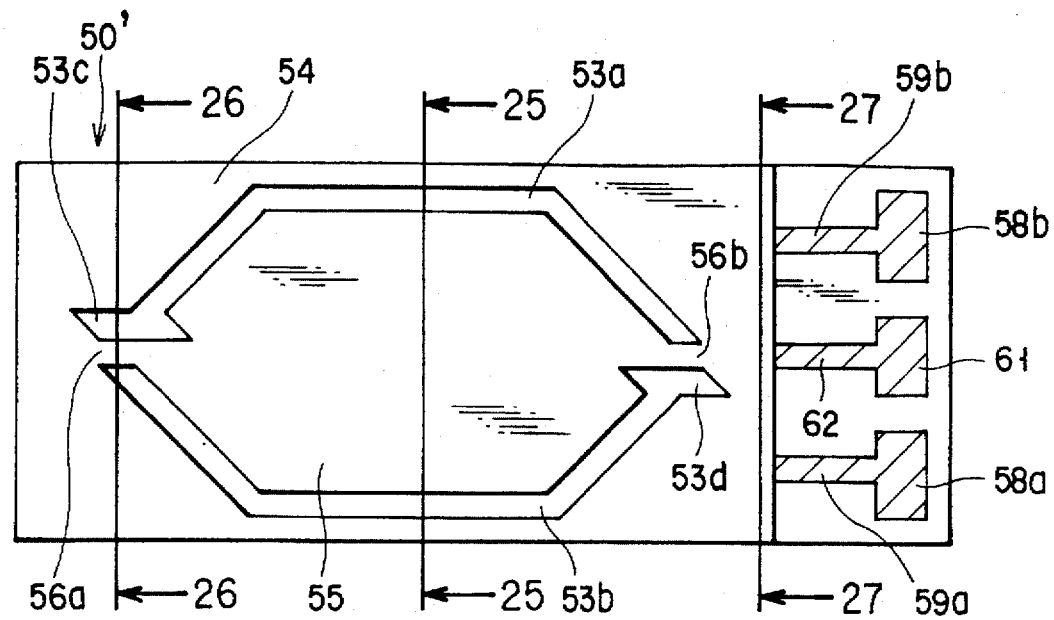
FIG. 23 is a plan view of the galvanomirror according to the seventh embodiment.
Figure 24:
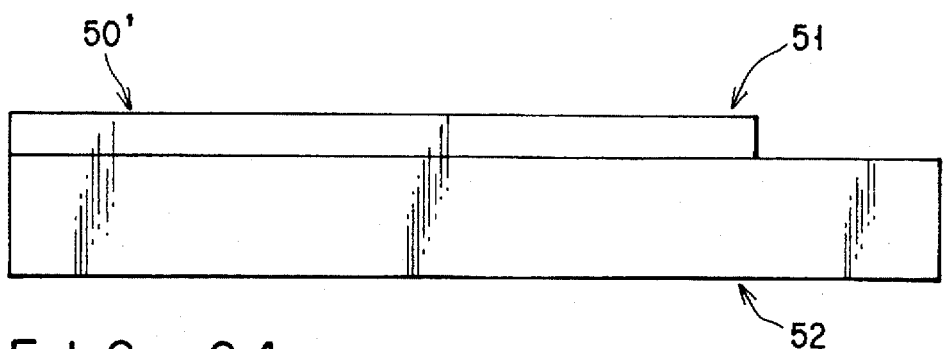
FIG. 24 is a side view of the galvanomirror according to the seventh embodiment.
Figure 25:
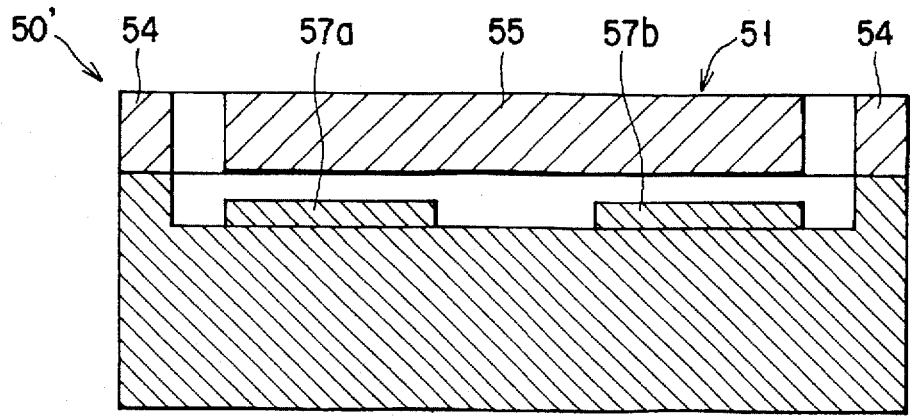
FIG. 25 is a cross-sectional view taken along line 25—25 in FIG. 23.
Figure 26:
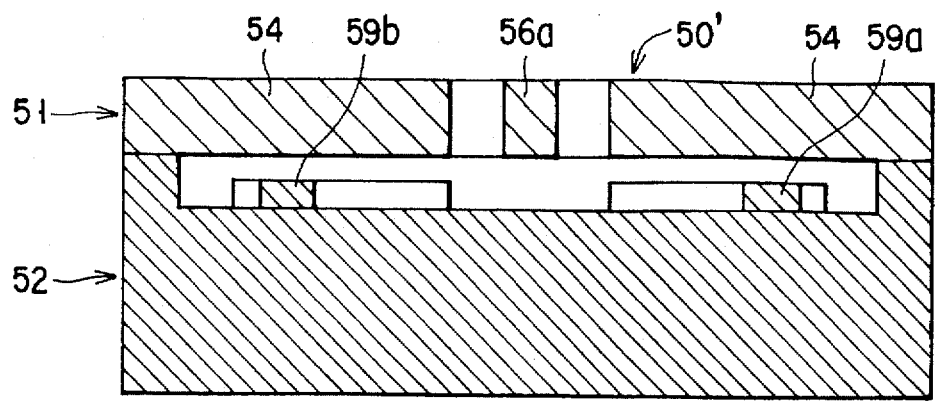
FIG. 26 is a cross-sectional view taken along line 26—26 in FIG. 23.
Figure 27:
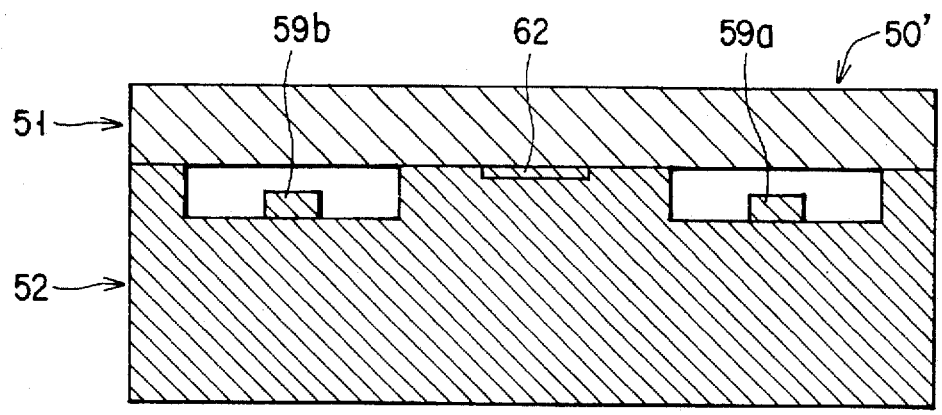
FIG. 27 is a cross-sectional view taken along line 27—27 in FIG. 23.

FIG. 22 is a perspective view showing a galvanomirror 50' according to the seventh embodiment, FIG. 23 is a plan view thereof, FIG. 24 is a side view thereof, FIG. 25 is a cross-sectional view taken along line 25—25 in FIG. 23, FIG. 26 is a cross-sectional view taken along line 26—26 in FIG. 23, and FIG. 27 is a cross-sectional view taken along line 27—27 in FIG. 23.

In the seventh embodiment, the shapes of portions near the elastic portions 56a and 56b supporting the rocking portion 55 are modified. Specifically, grooves 53c and 53d are formed so that the straight line connecting the two elastic portions 56a and 56b (i.e. penetrating the center of gravity of rocking portion 55) may be parallel to the (111) plane of silicon. The groove 53c is provided on one side of the elastic portion 56a, and the groove 53d is provided on one side of the elastic portion 56b. However, the groove 53c may be provided on both sides of the elastic portion 56a and the groove 53d on both sides of elastic portion 56b.

In the seventh embodiment, terminals 58a and 58b and wiring elements 59a and 59b for supplying current to the electrodes 57a and 57b are formed on one side of the galvanomirror 50' (i.e. on the right side in FIG. 22). A ground terminal 61 and a ground wiring element 62 are newly provided between the terminal 58a and wiring element 59a, on the one hand, and the terminal 58b and wiring element 59b, on the other. The ground terminal 61 and ground wiring element 62, as shown in FIG. 27, are formed in pressure contact with part of the first plate 51. Thereby, the fixing portion 54, rocking portion 55 and two elastic portions 56a and 56b, which constitute the first plate 51, are set at zero potential.

Needless to say, the seventh embodiment has the same advantages as the preceding embodiments. In addition, since the straight line connecting the two elastic portions 56a and 56b is parallel to the (111) plane of silicon, the surfaces of the elongated elastic portions 56a and 56b do not become irregular and no burr-like etched portions will form. Accordingly, the possibility of breakage of elastic portions 56a and 56b due to stress concentration is reduced, the product with high shock resistance can be obtained. Besides, the elastic portions 56a and 56b can be processed more finely.

Since the ground terminal 61 and ground wiring element 62 are provided, the rocking portion 55 can be driven by a potential difference with respect to the ground level (zero potential).

Furthermore, since the rocking portion 55 is grounded, the rocking portion 55 is not charged with static electricity. A floating contaminant, such as dust, does hardly adhere to the reflection mirror, and the performance of the galvanomirror 9 is maintained for a long time.

An eighth embodiment of the galvanomirror 50 of the present invention will now be described.

Figure 28:
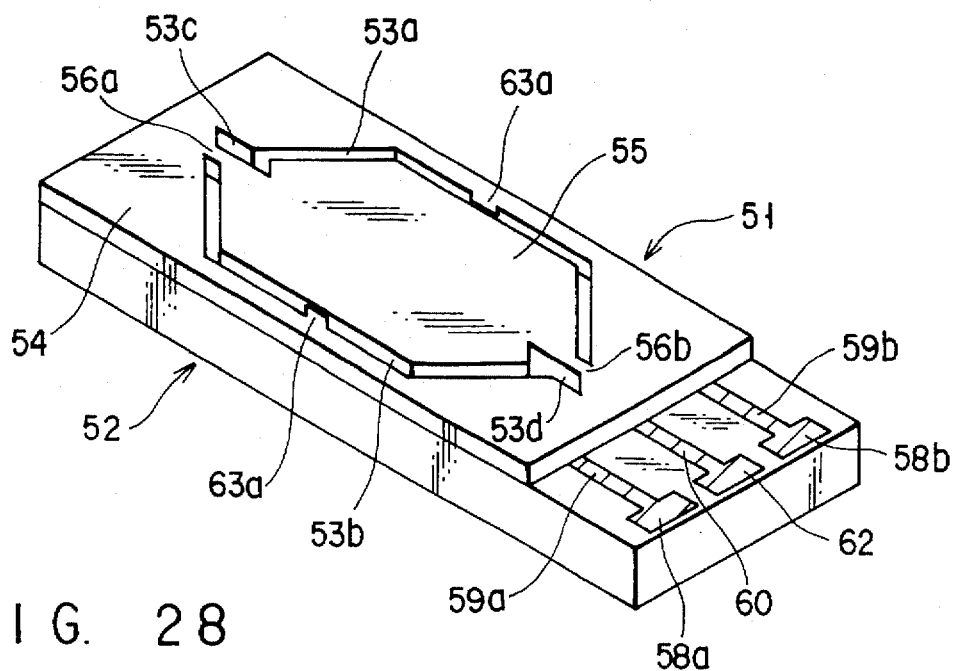
FIG. 28 is a perspective view of a galvanomirror according to an eighth embodiment of the invention.
Figure 29:
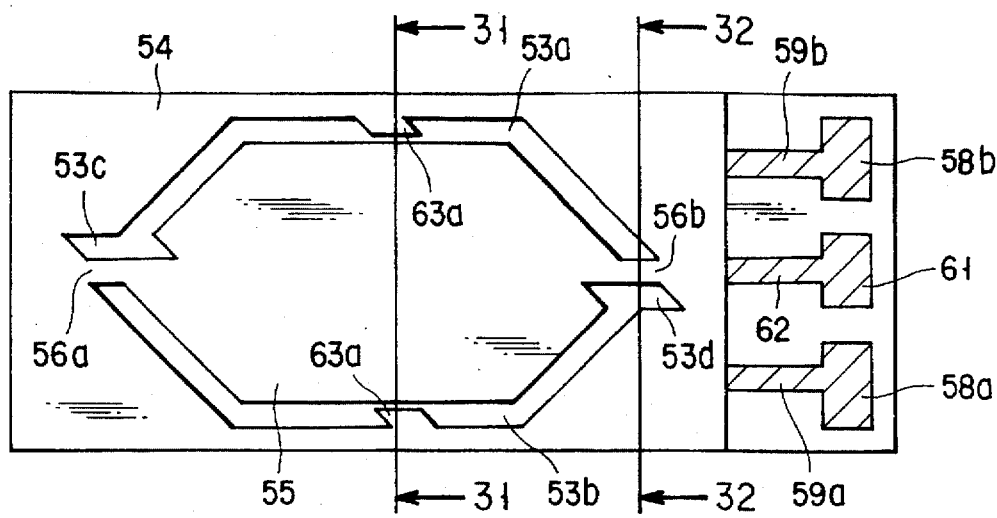
FIG. 29 is a plan view of the galvanomirror according to the eighth embodiment.
Figure 30:
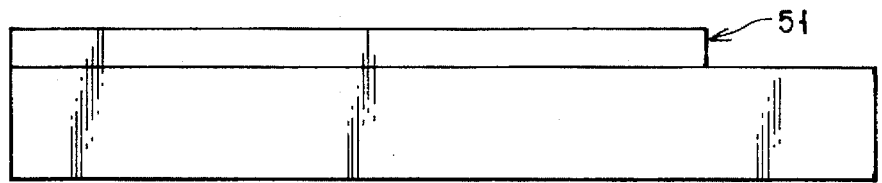
FIG. 30 is a side view of the galvanomirror according to the eighth embodiment.
Figure 31:
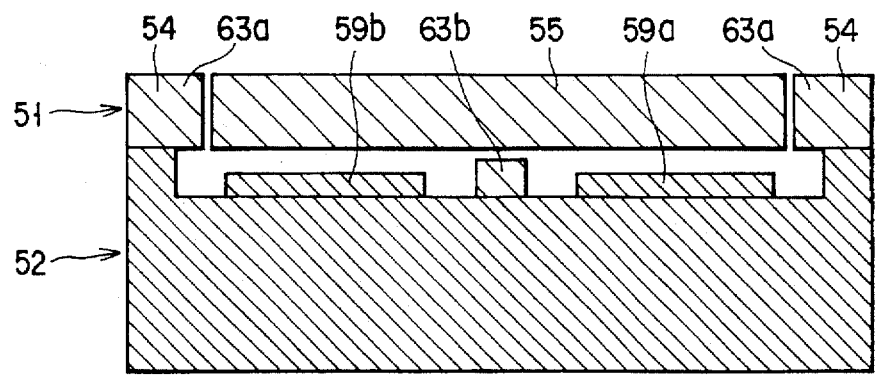
FIG. 31 is a cross-sectional view taken along line 31—31 in FIG. 29.
Figure 32:
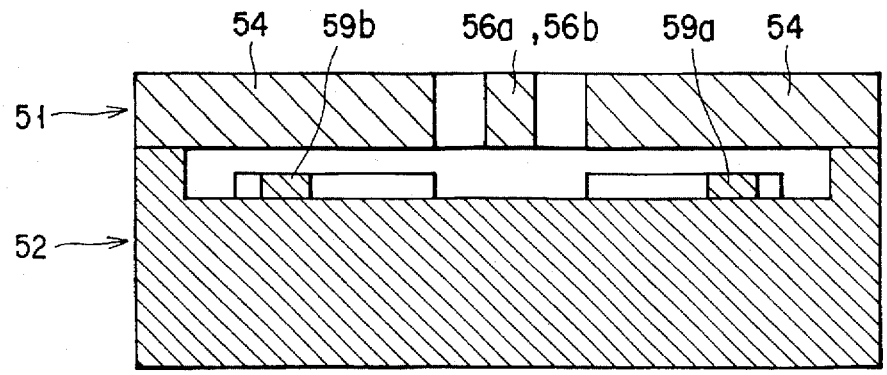
FIG. 32 is a cross-sectional view taken along line 32—32 in FIG. 29.

FIG. 28 is a perspective view showing the galvanomirror of the eighth embodiment, FIG. 29 is a plan view thereof, FIG. 30 is a side view thereof, FIG. 31 is a cross-sectional view taken along line 31—31 in FIG. 29, and FIG. 32 is a cross-sectional view taken along line 32—32 in FIG. 29.

In the eighth embodiment, as shown in FIG. 28, a plurality of projections (restriction means) 63a are formed to project into the grooves 53a and 53b of first plate 51. The projections 63a are formed integral with the fixing portion 54 by anisotropic etching, etc. The clearance between each projection 63a and rocking portion 55 is about 1 micron. The positions and the number of projections 63a may be freely determined.

The galvanomirror of this embodiment is constructed such that the projections 63a may come into contact with the side faces of the rocking portion 55 while the rocking portion 55 is rocking. Thus, the projections 63a can function as stoppers for limiting the rocking angle of the rocking portion 55. If the size of each projection 63a extending in parallel to the reflection mirror surface M is controlled prior to the manufacture of the galvanomirror, the maximum rocking angle of rocking portion 55 can be set at a desired value. Even if the galvanomirror or optical disk drive has received shock, the elastic portion 56a, 56b does not deform beyond the elastic limit and the galvanomirror is not adversely affected (e.g. it is not destroyed).

Since the projections 63a are formed integral with the fixing portion 54, the potential of the projections 63a is equal to that of the rocking portion 55. It is thus possible to prevent an arc from occurring and destroying the rocking portion 55 or the driving circuit.

In the eighth embodiment, as shown in FIG. 31, a projection (restriction means) 63b is formed on the second plate 52. The projection 63b is situated just below the line connecting the two elastic portions 56a and 56b (on the side opposite to the reflection mirror). The number of projections 63b may be freely chosen. If the projection 63b is provided just below the rotational axis of the rocking portion 55, the rocking motion of the rocking portion 55 is not prevented during the normal control of the rocking angle of the reflection mirror.

Vertically downward movement of the rocking portion 55 is limited. Thus, while the galvanomirror is cut out from the silicon wafer by dicing means, etc., the elastic portions 56a and 56b are prevented from deforming beyond the elastic limit due to pressure of injected water. Therefore, the galvanomirror 50 is not adversely affected and, for example, is not destroyed. Besides, the galvanomirror 50 or optical disk apparatus has high resistance to shock exerted in a direction perpendicular to the reflection mirror surface M.

The potential of the projection 63b, as well as projection 63a, is equal to that of the rocking portion 55. It is thus possible to prevent an arc from occurring and destroying the rocking portion 55 or the driving circuit.

FIGS. 33 and 34 are perspective views showing modifications of the projection 63a shown in FIGS. 28 and 29. A galvanomirror shown in FIG. 33 is provided with spaces 64 between the fixing portion 54 of the first plate 51 and the second plate 52, thereby facilitating deformation of the projections 63a. A galvanomirror shown in FIG. 34 is provided with spaces 64 between the fixing portion 54 and second plate 52 as well as notches, so that cantilevers 65 are formed. Thus, elastic deformation of the projections 63a is facilitated. With this structure, when the rocking portion 55 comes into contact with the fixing portion 54, shock to the fixing portion 54 is decreased and an adverse affect on the rocking portion 55 or elastic portions 56a and 56b can be prevented.

A ninth embodiment of the galvanomirror according to the present invention will now be described. The basic structure of the ninth embodiment is the same as that of the sixth embodiment, and common parts are denoted by like reference numerals without describing them.

FIG. 35 is a perspective view showing the galvanomirror according to the ninth embodiment, FIG. 36 is a perspective view showing the bottom surface of the first plate 51, and FIG. 37 is a perspective view showing the top surface of the second plate 52.

In the ninth embodiment, as shown in FIG. 36, a plurality of recess portions 66 are formed in the bottom surface of the rocking portion 55 of first plate 51. The recess portions 66 extend in a direction substantially perpendicular to the straight line connecting the two elastic portions 56a and 56b. As is shown in FIG. 37, projection portions 67 are formed on those surface portions of the second plate 52 facing the bottom surface of the rocking portion 55, which correspond to the recess portions 66. The recess portions 66 and projection portions 67 are arranged in a telescopic fashion and in a non-contact state, with a gap of about 1 micron to 7 microns provided therebetween.

Electrodes 68a and 68b arranged along the axis of rocking movement in stripes, as indicated by hatched lines in FIG. 37, are disposed on the projection portions 67. The electrodes 68a and 68b have the same functions as the electrodes 57a and 57b in the first embodiment. The electrodes 68a and 68b are connected to terminals 58a and 58b via wiring elements 59a and 59b for electrical connection with the outside.

By virtue of the recess portions 66 and projection portions 67, the first plate 51 and second plate 52 can situated relatively close to each other. The projection portions 67 are provided with electrodes 68a and 68b. Thus, when voltage is applied to the electrodes 68a and 68b, a high rotational acceleration can be obtained while an inertia moment acting on the rocking portion 55 is reduced as much as possible.

Accordingly, the drive speed of the rocking portion 55 is increased and the galvanomirror with high responsivity.

If the first plate 51 is provided with recess portions 66 and the second plate 52 is provided with projection portions 67, the gap length between the plates 51 and 52 is reduced while the total volume of the gap increases. Consequently, a sufficient air passage is provided while the rocking portion 55 is moved. If such an air passage is provided, non-linearity of drive force due to aerial viscous resistance is remarkably reduced, and the controllability is greatly stabilized.

Since the recess portions 66 and projection portions 67 extend perpendicular to the axis of rocking movement, the recess portions 66 hardly come into contact with the projection portions 67, as compared to the case where these portions 66 and 67 extend along the axis of rocking movement. Thus, the gap between the first plate 51 and second plate 52 can be reduced relatively easily and the drive responsivity can be easily enhanced.

Since the recess portions 66 and projection portions 67 extend perpendicular to the axis of rocking movement, the rigidity of the rocking portion 55 can be stably maintained. FIG. 38 illustrates by a solid line a deformation mode of the rocking portion 55 at the time of driving. Specifically, the rocking portion 55 curves and deforms in a direction perpendicular to the axis of rocking movement. In this embodiment, a kind of beam-structure is provided to enhance the rigidity in the direction of deformation. Therefore, very stable control operations can be performed.

Since the recess portions 66 and projection portions 37 are arranged in a telescopical fashion, a variation in attraction force due to a variation in gap length during rocking movement can be reduced and stable control operations can be performed. Therefore, the rocking portion 55 can be positioned precisely.

Furthermore, the weight of the rocking portion 55 is reduced by the formation of recess portions 66, and practical advantages can be obtained. For example, when the rocking portion 55 comes into contact with the second plate 52, a maximum stress acting on the elastic portions 56a and 56b can be reduced and destruction by shock can be surely prevented.

A tenth embodiment of the invention will now be described. In the tenth embodiment, the shapes of the recess portions and projection portions in the ninth embodiment are modified. The common structural elements are denoted by like reference numerals and a description thereof is omitted. FIG. 39 is a perspective view showing the bottom surface of the first plate 51 in the tenth embodiment. The bottom surface of the rocking portion 55 is provided with recess portions 70. The recess portions 70 extend substantially in the same direction as the recess portions 66 in the ninth embodiment, and the shapes thereof differ from those of the recess portions 66. Specifically, the direction in which silicon can be easily etched is determined by the crystal orientation at covalent bonds of silicon. This direction does not necessarily coincide with the axis of rocking movement (i.e. this direction crosses the axis of rocking movement). In this embodiment, zigzag recess portions 70 are formed, as shown in FIG. 39, and projection portions (not shown) are disposed so as to be situated in the recess portions 70. Thus, substantially the same advantage as in the ninth embodiment can be obtained. In particular, if the isotropic orientation of silicon is made to coincide with the direction of etching, the recess portions 70 can be formed deeper and the advantage of the ninth embodiment can be enhanced.

It is desirable that the shapes of the projection portions (not shown) be substantially equal to those of the recess portions 70. However, it is not necessary that the former be the same as the latter.

An eleventh embodiment of the present invention will now be described. In the eleventh embodiment, the shapes of the recess portions and projection portions in the ninth embodiment are modified. The common structural elements are denoted by like reference numerals and a description thereof is omitted. FIG. 40 is a perspective view showing the bottom surface of the first plate 51 in the eleventh embodiment. In this modification, recess portions 71 extend in a direction different from the direction of extension of the recess portions 66 in the ninth embodiment. The recess portions 71 extend in the direction in which silicon can be easily etched, like the tenth embodiment or modification shown in FIG. 39. Specifically, the recess portions 71 extend in one of two directions defining the zigzag shape of the recess portions 70 shown in FIG. 39. With the structure of the eleventh embodiment, too, the same advantage as with the ninth embodiment can be obtained.

In the above-described ninth, tenth and eleventh embodiments, the first plate 51 is formed of silicon-based material. However, the first plate 51 may be formed of glass. In this case, the glass is etched to form recess portions 66, 70 and 71 and the same advantages are obtained.

In addition, in the ninth, tenth and eleventh embodiments, the first plate 51 is provided with recess portions 66, 70 and 71 and the second plate 52 is provided with projection portions 67. Alternatively, in order to bring about another advantage, it is possible that the first plate 51 is provided with the recess portions while the second plate 52 is not provided with projection portions. In this case, the first plate 51 alone is provided with the recess portions and thus the total volume of the gap between the plates 51 and 52 is reduced. Accordingly, an air passage for air at the time of driving the rocking portion 55 is hardly provided, and the galvanomirror is considerably influenced by aerial viscous resistance. This viscous resistance will increase as the distance between the first and second plates 51 and 52 decreases. As a result, the possibility of collision between the first and second plates 51 and 52 can be reduced to a minimum.

The present invention is not limited to the above embodiments and modifications, and can variously modified without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

a rocking portion having first and second surfaces, said rocking portion being electrically chargeable, said first surface having a reflection surface for reflecting said laser beam;

a support portion having first and second end portions for rockably supporting said rocking portion, said first end portion being connected to said rocking portion;

a fixing member connected to said second end portion of said support portion and having an opposed portion opposed to said second surface of the rocking portion with a predetermined gap interposed therebetween; and an electrically chargeable electrode provided on said opposed portion of said fixing member for reflecting said laser beam at a desired angle by electrostatically driving said rocking portion, wherein at least one of said second surface of said rocking portion and said opposed portion of said fixing member is provided with a recessed passage for reducing an air pressure caused when said rocking portion is rocked.

2. The optical disk drive according to claim 1, wherein said passage is defined by an irregular portion provided on at least one of said second surface of said rocking portion and said opposed portion of said fixing member.

3. The optical disk drive according to claim 1, wherein said passage extends in parallel to the axis of rocking movement of said rocking portion.

4. The optical disk drive according to claim 3, wherein said passage includes a curved portion gradually curved away from said axis of rocking movement from a central part to both end parts of said rocking portion.

5. The optical disk drive according to claim 1, wherein said passage extends in a direction perpendicular to the axis of rocking movement of said rocking portion.

6. The optical disk drive according to claim 1, wherein said passage comprises a first passage portion provided on one of said second surface of said rocking portion and said opposed portion of said fixing member, and a second passage portion provided on said second surface of said rocking portion and said opposed portion of said fixing member, said first passage portion extends substantially in parallel to the axis of rocking movement of said rocking portion, and said second passage portion extends in a direction perpendicular to said first passage portion.

7. The optical disk drive according to claim 1, wherein said passage is defined by recess portions and projection portions provided on said opposed surface of said fixing member at regular intervals, and said electrode has a slit for exposing said recess portions of the passage to said rocking portion.

8. The optical disk drive according to claim 1, wherein said reflection surface of said rocking portion is formed by mirror-processing said rocking portion itself.

9. The optical disk drive according to claim 8, wherein said rocking portion is formed of a semiconductor material.

10. The optical disk drive according to claim 9, wherein said semiconductor material contains silicon.

11. The optical disk drive according to claim 10, wherein said reflection surface is formed in parallel to a (110) plane of silicon.

12. The optical disk drive according to claim 1, wherein said rocking portion and said support portion are formed of the same material as one body.

13. The optical disk drive according to claim 12, wherein said rocking portion and said support portion are formed of a semiconductor material.

14. The optical disk drive according to claim 13, wherein said semiconductor material contains silicon.

15. The optical disk drive according to claim 14, wherein said support portion has a linear shape along a (111) plane of silicon.

16. The optical disk drive according to claim 1, wherein said galvanomirror further comprises a restriction portion, coupled to said fixing portion, for restricting an angle of rocking movement of said rocking portion.

17. The optical disk drive according to claim 16, wherein said restriction portion elastically comes into contact with said rocking portion, to restrict said angle of rocking movement of said rocking portion.

18. The optical disk drive according to claim 17, wherein said restriction portion comes into contact with a side face of said rocking portion to restrict said angle of rocking movement of said rocking portion.

19. The optical disk drive according to claim 16, wherein said restriction portion is provided on said opposed surface of said fixing member and comes into contact with said rocking portion to restrict said angle of rocking movement of said rocking portion.

20. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

a rocking portion having first and second surfaces, said rocking portion being electrically chargeable, said first surface having a reflection surface for reflecting said laser beam;

a support portion having first and second end portions for rockably supporting said rocking portion, said first end portion being connected to said rocking portion;

a fixing member connected to said second end portion of said support portion and having an opposed portion opposed to said second surface of the rocking portion with a predetermined gap interposed therebetween;

first and second electrodes provided at positions on said opposed portion of said fixing member, which positions are symmetric with respect to an axis of rocking movement of said rocking portion; and a control unit for charging said first and second electrodes to have a same polarity and for changing potentials of said first and second electrodes with respect to a potential of said rocking portion to electromagnetically move said rocking portion about said axis of rocking movement, wherein at least one of said second surface of said rocking portion and said opposed portion of said fixing member is provided with a recessed passage for reducing an air pressure caused when said rocking portion is rocked.

21. The optical disk drive according to claim 20, wherein said control unit charges said first and second electrodes to have a same potentials and to have predetermined potential differences with respect to said rocking portion.

22. The optical disk drive according to claim 20, wherein said rocking portion is grounded.

23. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

a rocking portion having first and second surfaces, said rocking portion being electrically chargeable, said first surface having a reflection surface for reflecting said laser beam;

a support portion having first and second end portions for rockably supporting said rocking portion, said first end portion being connected to said rocking portion;

a fixing member connected to said second end portion of said support portion and having an opposed portion opposed to said second surface of the rocking portion with a predetermined gap interposed therebetween; and an electrically chargeable electrode provided on said opposed portion of said fixing member for reflecting the laser beam at a desired angle by electrostatically driving said rocking portion, wherein a length of said support portion in a direction parallel to said reflection surface of said rocking portion is less than a length of said support portion in a direction perpendicular to said reflection surface, wherein at least one of said second surface of said rocking portion and said opposed portion of said fixing member is provided with a recessed passage for reducing an air pressure caused when said rocking portion is rocked.

24. The optical disk drive according to claim 23, wherein said reflection surface of said rocking portion is formed by mirror-processing said rocking portion itself.

25. The optical disk drive according to claim 24, wherein said rocking portion is formed of a semiconductor material.

26. The optical disk drive according to claim 25, wherein said semiconductor material contains silicon.

27. The optical disk drive according to claim 26, wherein said reflection surface is formed in parallel to a (110) plane of silicon.

28. The optical disk drive according to claim 23, wherein said rocking portion and said support portion are formed of the same material as one body.

29. The optical disk drive according to claim 28, wherein said rocking portion and said support portion are formed of a semiconductor material.

30. The optical disk drive according to claim 29, wherein said semiconductor material contains silicon.

31. The optical disk drive according to claim 30, wherein said support portion has a linear shape along a (111) plane of silicon.

32. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

a rocking portion having first and second surfaces, said rocking portion being electrically chargeable, said first surface having a reflection surface for reflecting said laser beam;

a support portion having first and second end portions for rockably supporting said rocking portion, said first end portion being connected to said rocking portion;

a fixing member connected to said second end portion of said support portion and having an opposed portion opposed to said second surface of the rocking portion with a predetermined gap interposed therebetween, said second surface opposing said fixing member; and an electrically chargeable electrode provided on said opposed portion of said fixing member for reflecting said laser beam at a desired angle by electrostatically driving said rocking portion, wherein at least one of said second surface of said rocking portion and said opposed portion of said fixing member is provided with a passage for reducing an air pressure caused when said rocking portion is rocked, said passage being provided within a peripheral edge of said second surface of said rocking portion when provided on said rocking portion, said passage being provided within an outer peripheral edge of said fixing member when provided on said opposed portion of said fixing member.

33. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

a rocking portion having first and second surfaces, said rocking portion being electrically chargeable, said first surface having a reflection surface for reflecting said laser beam;

a support portion having first and second end portions for rockably supporting said rocking portion, said first end portion being connected to said rocking portion;

a fixing member connected to said second end portion of said support portion and having an opposed portion opposed to said second surface of the rocking portion with a predetermined gap interposed therebetween, said second surface of said rocking portion opposing said fixing member;

first and second electrodes provided at positions on said opposed portion of said fixing member, which positions are symmetric with respect to an axis of rocking movement of said rocking portion; and a control unit for charging said first and second electrodes to have a same polarity and for changing potentials of said first and second electrodes with respect to a potential of said rocking portion to electromagnetically move said rocking portion about said axis of rocking movement, wherein at least one of said second surface of said rocking portion and said opposed portion of said fixing member is provided with a passage for reducing an air pressure caused when said rocking portion is rocked, said passage being provided within a peripheral edge of said second surface of said rocking portion when provided on said rocking portion, said passage being provided within an outer peripheral edge of said fixing member when provided on said opposed portion of said fixing member.

34. An optical disk drive having a drive unit for driving a storage medium and an optical head, driven relative to the storage medium, for focusing a laser beam onto the storage medium, a galvanomirror for correcting a light passage of the laser beam, a lens for focusing the laser beam from the galvanomirror onto the storage medium, and light receiving means for receiving the laser beam reflected by the storage medium, said optical head including a light source for emitting the laser beam, said galvanomirror comprising:

- a rocking portion having first and second surfaces, said rocking portion being electrically chargeable, said first surface having a reflection surface for reflecting said laser beam;
- a support portion having first and second end portions for rockably supporting said rocking portion, said first end portion being connected to said rocking portion;
- a fixing member connected to said second end portion of said support portion and having an opposed portion opposed to said second surface of the rocking portion with a predetermined gap interposed therebetween, said second surface of said rocking portion opposing said fixing member; and
- an electrically chargeable electrode provided on said opposed portion of said fixing member for reflecting said laser beam at a desired angle by electrostatically driving said rocking portion, wherein a length of said support portion in a direction parallel to said reflection surface of said rocking portion is less than a length of said support portion in a direction perpendicular to said reflection surface, wherein at least one of said second surface of said rocking portion and said opposed portion of said fixing member is provided with a passage for reducing an air pressure caused when said rocking portion is rocked, said passage being provided within a peripheral edge of said second portion of said rocking portion when provided on said rocking portion, said passage being provided within an outer peripheral edge of said fixing member when provided on said opposed portion of said fixing member.

\* \* \* \* \*